United States Patent [19]

Brems

[11] Patent Number: 4,726,240
[45] Date of Patent: Feb. 23, 1988

[54] TRANSFER MECHANISM AND DRIVE WITH STRAIGHT LINE LIFT AND LOWER

[76] Inventor: John H. Brems, Apt. 11-G, 2800 S. Ocean Blvd., Boca Raton, Fla. 33432

[21] Appl. No.: 790,506

[22] Filed: Oct. 23, 1985

Related U.S. Application Data

[63] Continuation-in-part of Ser. No. 463,032, Feb. 1, 1983, abandoned.

[51] Int. Cl.$^4$ .................. F16H 21/02; B66C 23/00
[52] U.S. Cl. .................................. 74/27; 74/25; 74/394; 414/744 R
[58] Field of Search ............... 74/22 R, 22 A, 24, 25, 74/27, 28, 394; 414/744 R, 744 A, 744 B, 744 C, 733, 737, 917

[56] References Cited

U.S. PATENT DOCUMENTS

| | | | |
|---|---|---|---|
| 573,412 | 12/1896 | Hutchison | 74/22 X |
| 2,407,310 | 9/1946 | Lundy et al. | 74/22 X |
| 2,949,789 | 8/1960 | Eminger | 74/24 X |
| 3,076,351 | 2/1963 | Moss | 74/394 |
| 3,112,134 | 11/1963 | Ponsen | 414/744 B X |
| 4,075,911 | 2/1978 | Brems | 74/816 |
| 4,457,659 | 7/1984 | Watanabe | 414/744 A |

FOREIGN PATENT DOCUMENTS 650027 9/1937 Fed. Rep. of Germany ... 414/744 R

Primary Examiner—Lawrence Staab
Attorney, Agent, or Firm—Barnes, Kisselle, Raisch, Choate, Whittemore & Hulbert

[57] ABSTRACT

A power drive and lift-and-carry mechanism in which a rotary input drives a mechanical system to produce a relatively long dwell stage and, in combination with a crank drive mechanism, produces a transfer motion with a substantially straight lift and lower motion coupled with a horizontal component in a smooth transfer motion for work parts.

17 Claims, 58 Drawing Figures

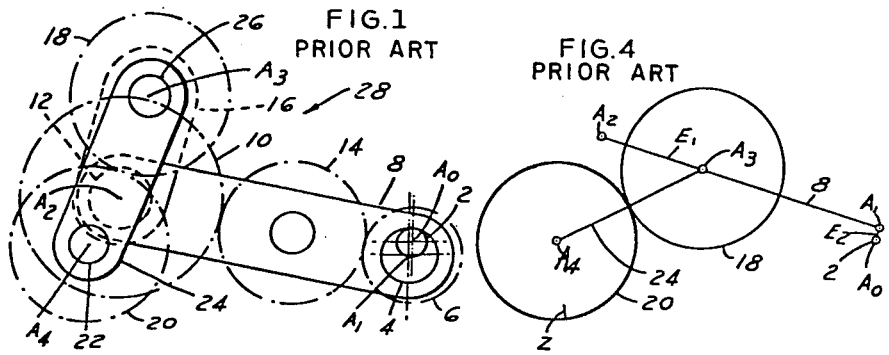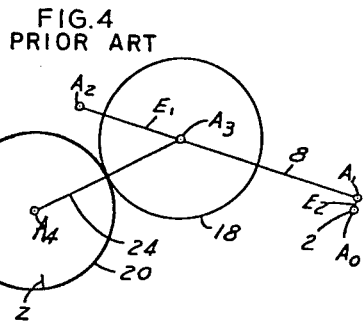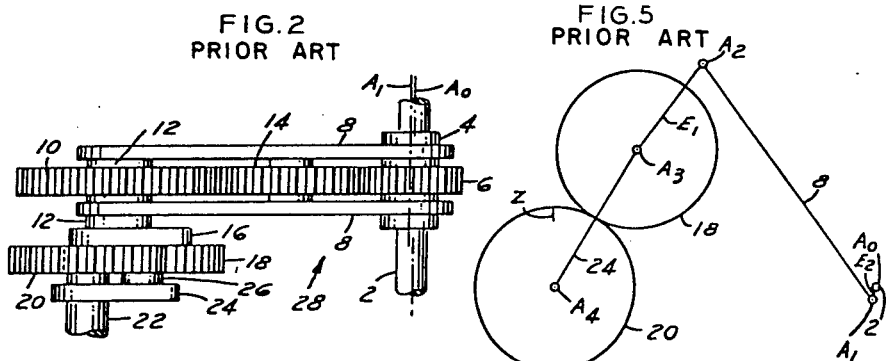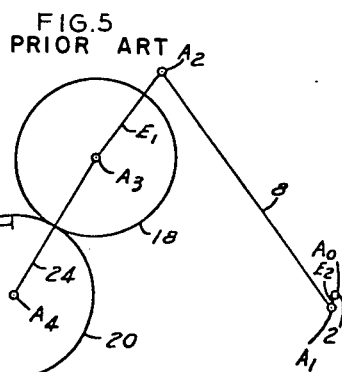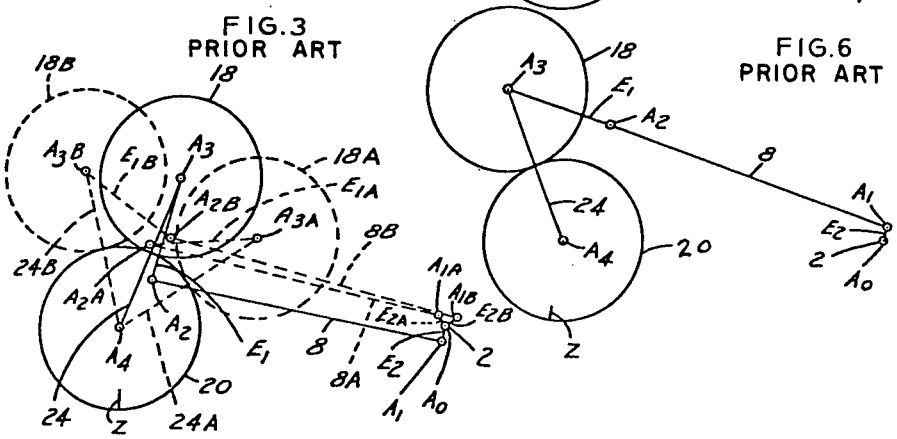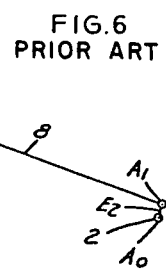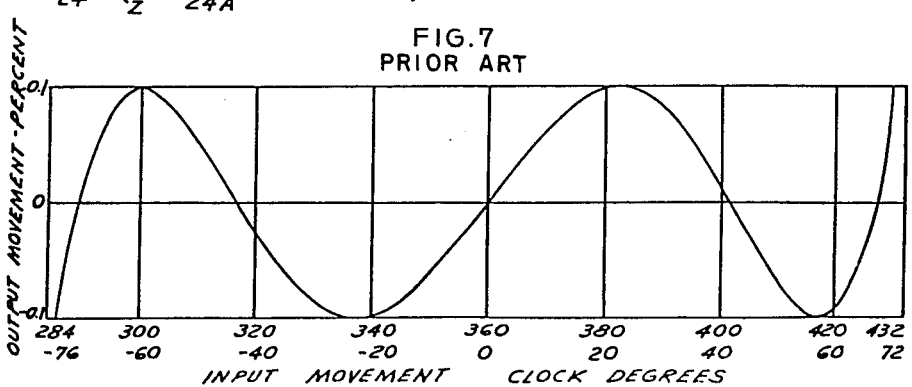

FIG.15
FIG.16
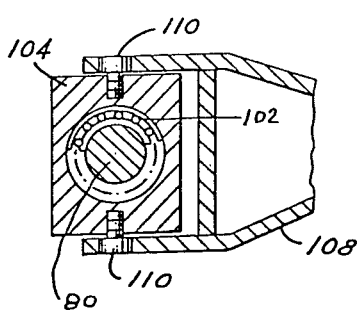
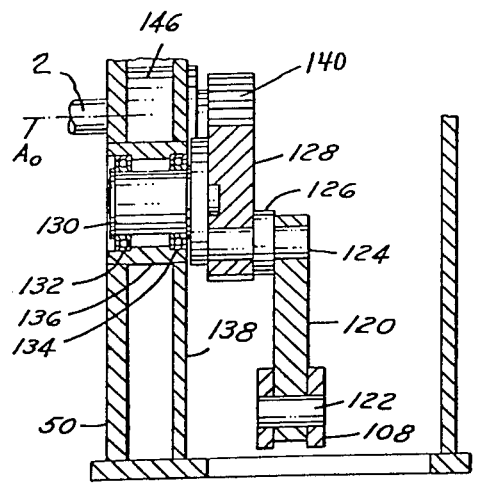
FIG.17
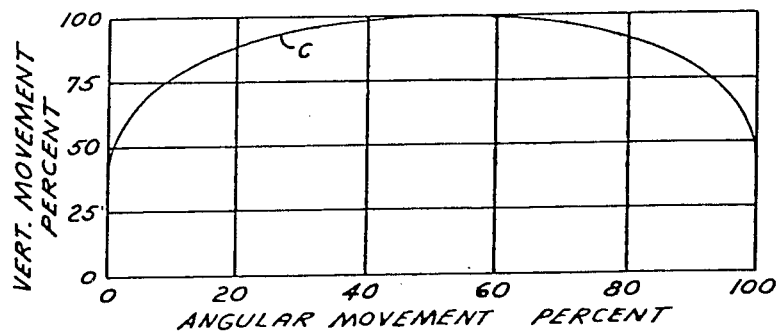
FIG.18
FIG.19
FIG.20
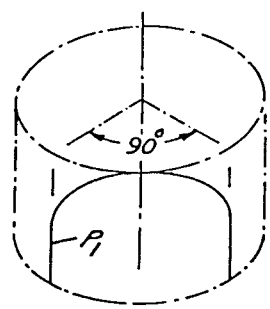
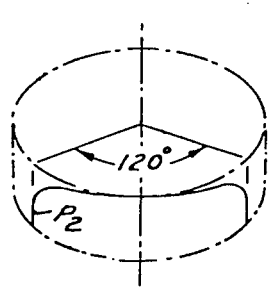
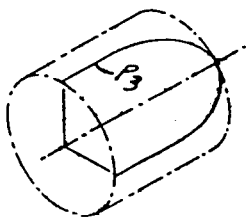

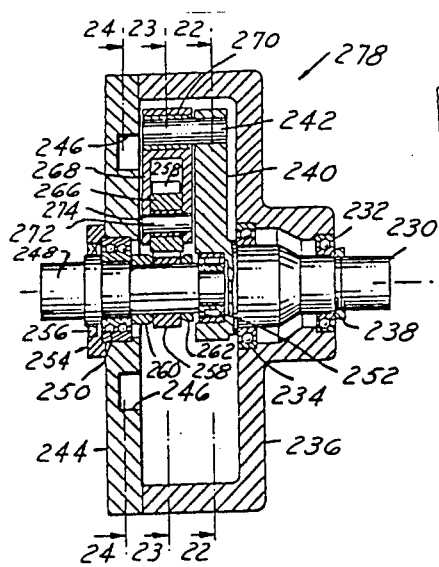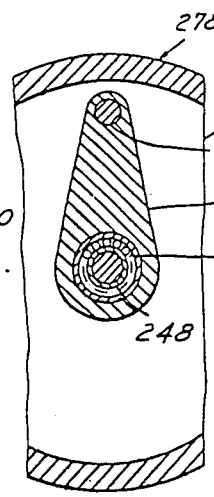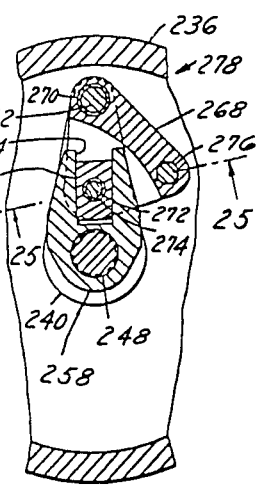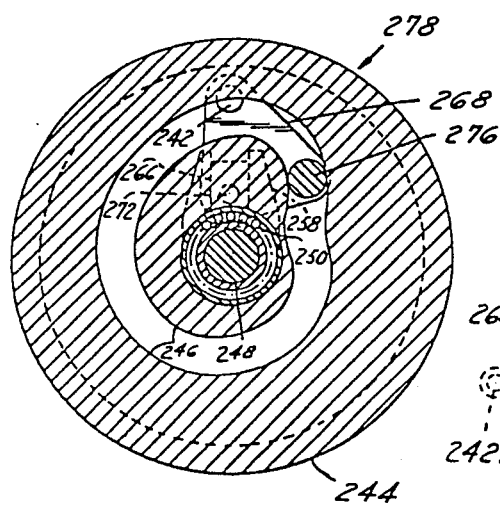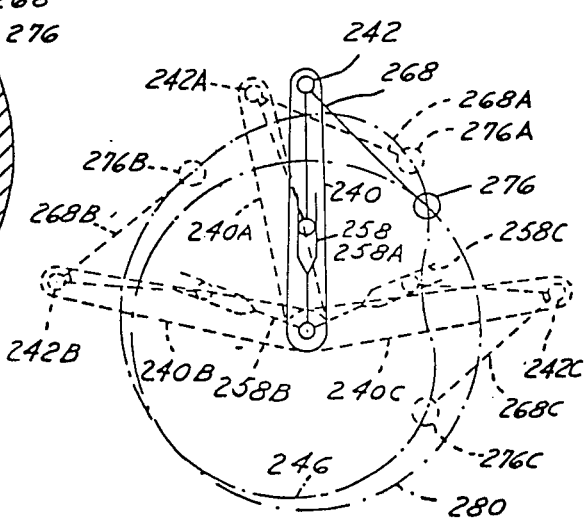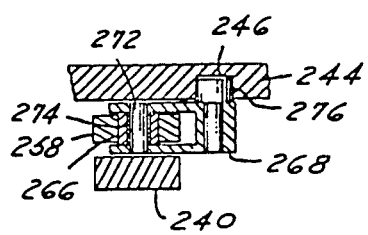

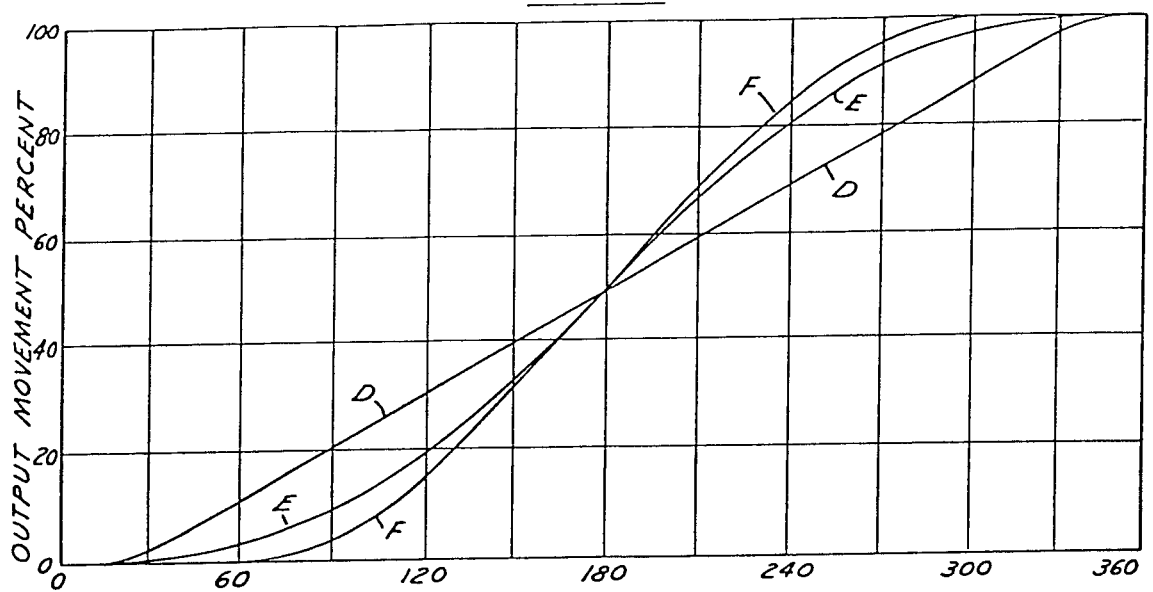
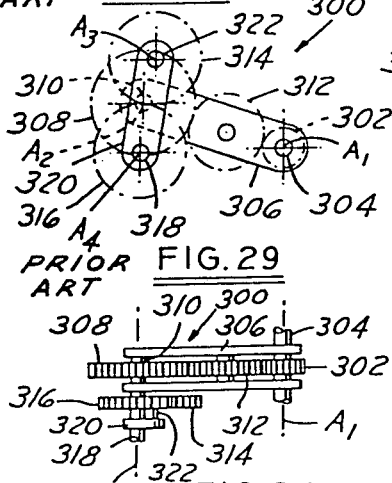
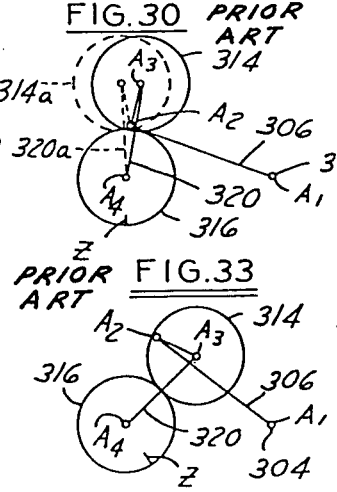
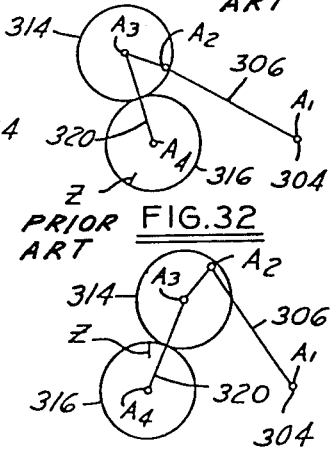
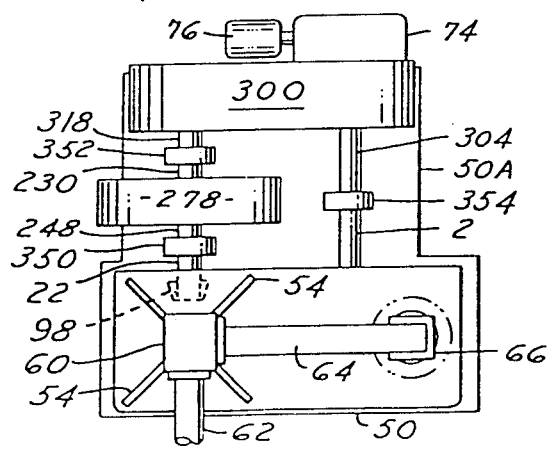
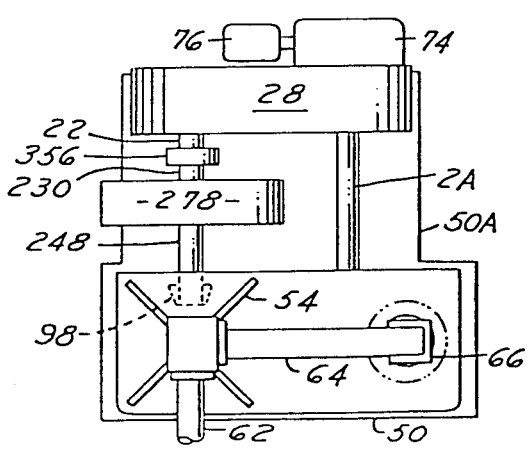

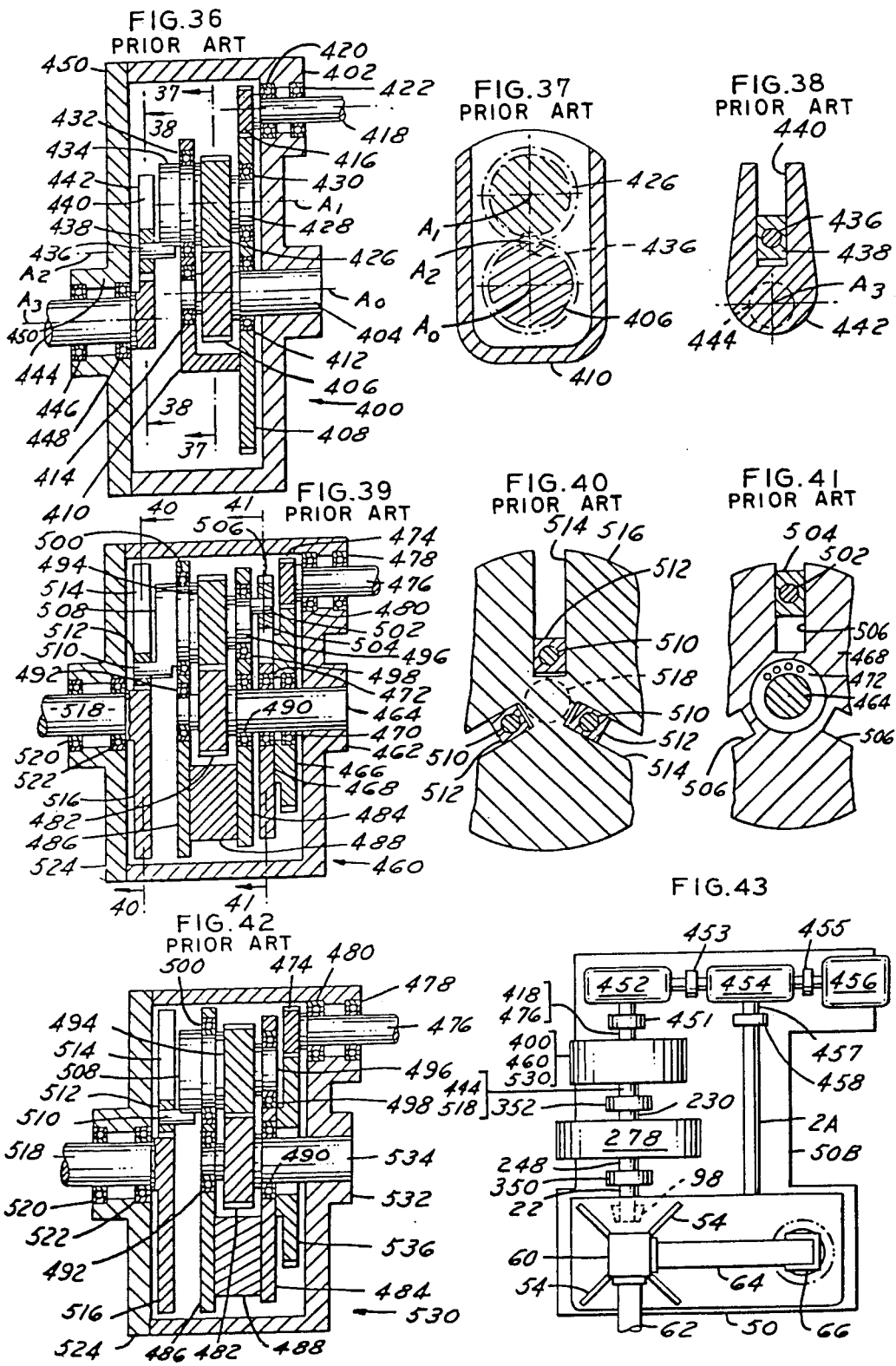

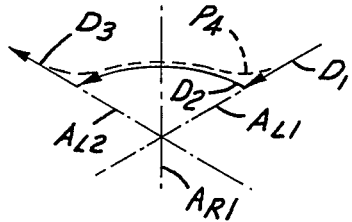
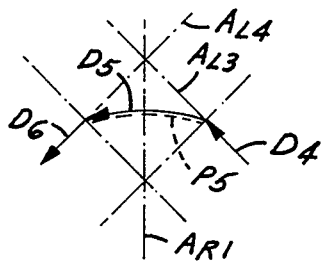
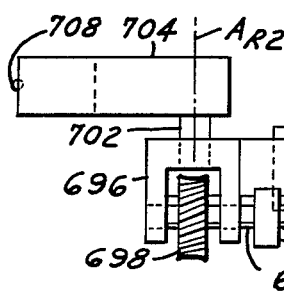
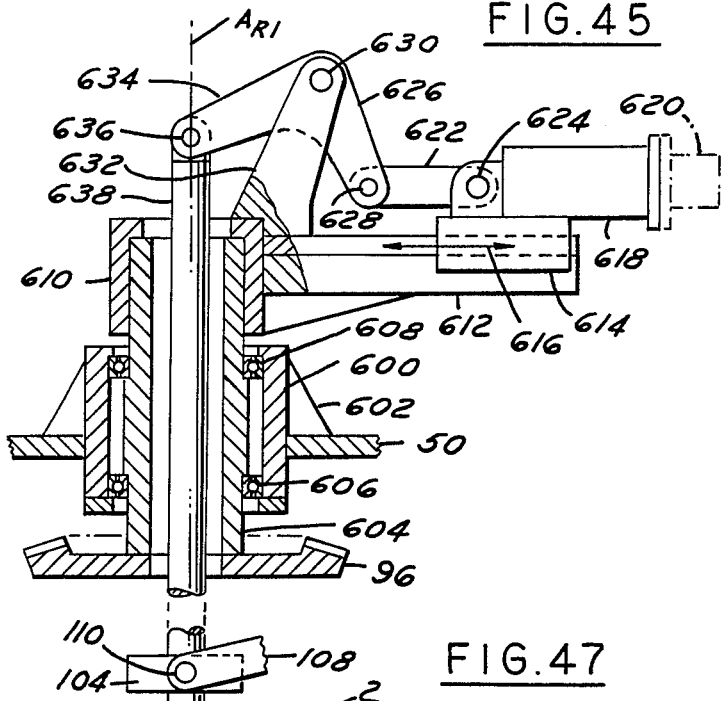
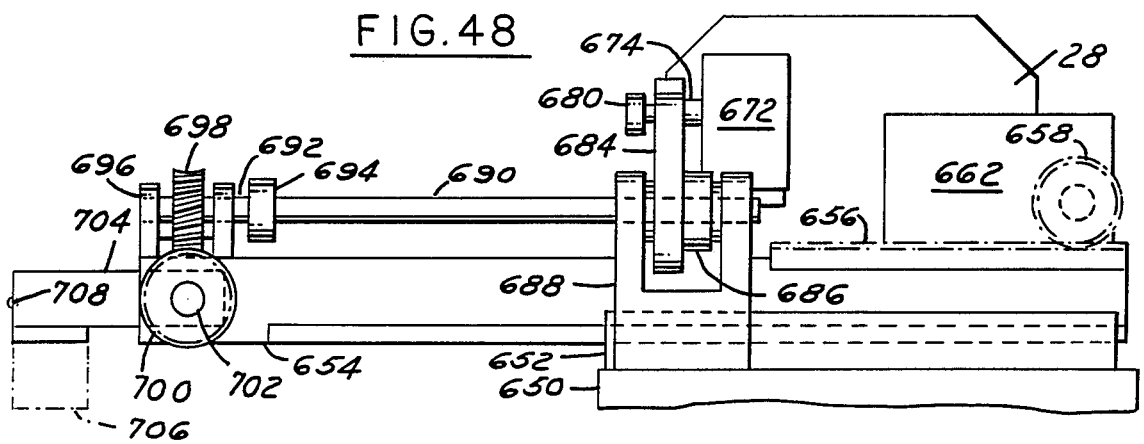

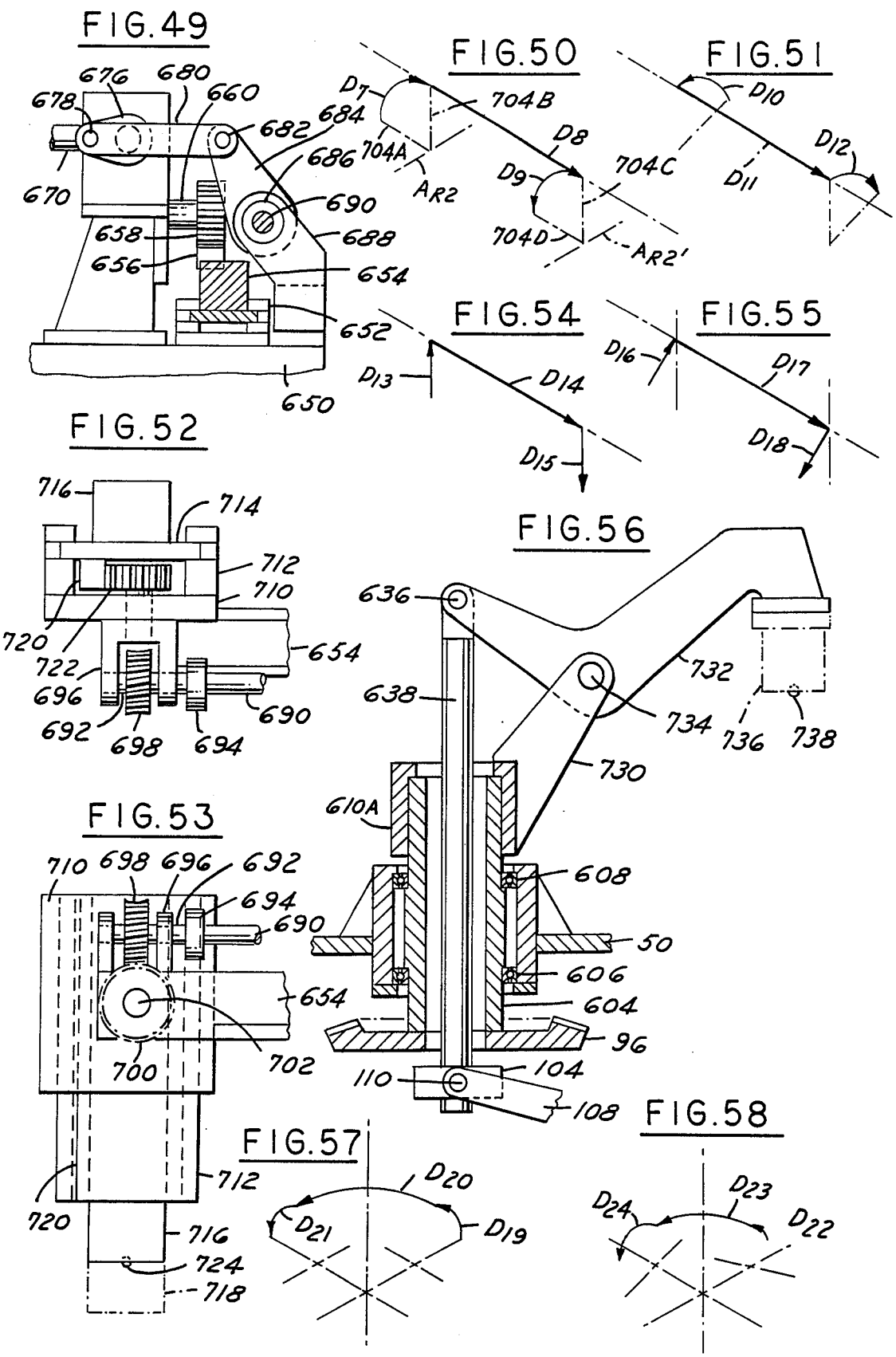

TRANSFER MECHANISM AND DRIVE WITH STRAIGHT LINE LIFT AND LOWER

RELATED APPLICATION

This application is a continuation-in-part of my co-pending application, Ser. No. 463,032, filed Feb. 1, 1983 now abandoned.

FIELD OF INVENTION

Power combination utilizing a rotary power input and a mechanism to produce a relatively long dwell which in combination can achieve a lift-and-carry motion for the transfer of parts from one station to another.

BACKGROUND OF INVENTION

In the field of workpiece transfer there arise many applications in which it is required that a given workpiece or workpieces be lifted vertically upward out of a fixture, pallet, or other work holding device, then moved along an arcuate path through a given angle or distance and then lowered into an advanced fixture, pallet, or other work holding device. It is general practice to use seperate cylinders, or independent mechanical systems to generate the vertical motion and arcuate motions respectively.

It is one object of this invention to provide a single simple mechanically interrelated system which is capable of generating the entire path comprised of a lift motion, a rotate motion, and a lower motion.

Other applications arise in which it is required that a workpiece be removed from a given fixture, pallet, or other work holding device, along a given arcuate or straight line and then transferred to a different location where it is reloaded into another given fixture, pallet, or work holding device, again along a given arcuate or straight line. It is again a general practice to use a separate cylinder, or independent mechanical system to generate the load-unload motion and another to generate the transfer motion.

It is another object of this invention to provide a single simple mechanically interrelated system which is capable of generating the arcuate or straight line load and unload motions with a transfer motion therebetween in a smooth uninterrupted single path.

In a more general sense, it is another object of this invention to provide a mechanically interrelated system which is capable of generating a generalized path for a transfer mechanism in which a first portion of its motion is along a path created by movement along one of its six degrees of freedom, a second portion of its movement is along a path created predominantly by movement along another of its six degrees of freedom, and a third portion of its movement is along a path created by a movement along the same degree of freedom as the first portion of movement, but in the opposite direction.

Other objects and features of the invention will be apparent in the following description and claims in which the best modes of the invention are set forth together with the principles of operation and details to enable persons skilled in the art to practice the invention.

BRIEF DESCRIPTION OF THE DRAWINGS

Drawings accompany the disclosure and the various views thereof may be briefly described as:

FIG. 1, a side view of one embodiment of the mechanisms disclosed in my U.S. Pat. No. 4,075,911 for generating intermittent long dwell index cycles.

FIG. 2, a plan view of the mechanism of FIG. 1.

FIG. 3, schematic drawings of principal elements of the mechanism of FIGS. 1 and 2 shown in three positions during the dwell portion of the cycle.

FIGS. 4–6, schematic drawings of principal elements of the mechanism of FIGS. 1 and 2 shown at positions representing $\frac{1}{4}$, $\frac{1}{2}$ and $\frac{3}{4}$ through an entire index cycle.

FIG. 7 a graph showing the true very slight oscillation of the output during the dwell for the mechanism of FIGS. 1 and 2.

FIG. 15, a partial section taken on line 15—15 of FIG. 13.

FIG. 16, a vertical section taken on line 16—16 of FIG. 13.

FIG. 17, a graph showing the interrelationship between vertical and angular movement created by the first embodiment of this invention.

FIG. 18, an isometric representation of the path generated by the first embodiment of this invention.

FIG. 19, an isometric representation of an alterante path which can be generated by the first embodiment of this invention with changed gear ratio and eccentricity.

FIG. 20, an isometric representation of an alternate path which can be generated by the first embodiment of this mechanism when it is rotated in space to make the axis of the ram horizontal.

FIG. 21, a longitudinal section of a mechanism useful for lengthening dwells and described as a differential cam system.

FIG. 22, a transverse section of the mechanism of FIG. 21 taken on line 22—22.

FIG. 23, a transverse section of the mechanism of FIG. 21 taken on line 23—23.

FIG. 24, a transverse section of the mechanism of FIG. 21 taken on line 24—24.

FIG. 25, a section taken on line 25—25 of FIG. 23.

FIG. 26, a schematic representation of the mechanism of FIG. 21 showing it in a base position and three additional displaced positions.

FIG. 27, a graph of the displacement characteristics of an illustrative differential cam mechanism, and of a combined mechanism comprised of a cycloidal output mechanism disclosed in my U.S. Pat. No. 3,789,676 and a differential cam mechanism.

FIG. 28, a side view of one embodiment of the mechanism disclosed in my U.S. Pat. No. 3,789,676 for generating an approxiamte cyclodial output.

FIG. 29, a plan view of the mechanism of FIG. 28.

FIGS. 30–33, schematic drawings of principal elements of the mechanism of FIG. 28 shown in five positions during an index cycle.

FIG. 34, a plan view, analogous to FIG. 11, of an alternate embodiment utilizing a long dwell mechanism comprised of the mechanism of FIGS. 28 and 29 driving the differential cam mechanism of FIGS. 21-26.

FIG. 35, a plan view, analogous to FIG. 11, of an alternate embodiment having an increased long dwell mechanism created by interposing the differential cam mechanism of FIGS. 21-26 into the rotate drive system of FIG. 11.

FIG. 36, a longitudinal section of the mechanism disclosed in my U.S. Pat. No. 4,018,090.

FIG. 37, a transverse section taken on line 37—37 of FIG. 36.

FIG. 38, a transverse section taken on line 38—38 of FIG. 36.

FIG. 39, a longitudinal section of one of the mechanisms disclosed in my U.S. Pat. No. 3,730,014.

FIG. 40, a transverse section taken on line 40—40 FIG. 39.

FIG. 41, a transverse section taken on line 41—41 of FIG. 39.

FIG. 42, a longitudinal section of a mechanism similar to the mechanism of FIGS. 31-33 but having no imput eccentricity.

FIG. 43, a plan view, analogous to FIG. 11, showing three alternate tandem mechanisms utilized as long dwell mechanisms, each comprised of the common differential cam mechanism 278 with alternate predrive mechanisms of FIGS. 36-38 or FIGS. 39-41 or FIG. 42.

FIG. 44, an isometric schematic diagram showing the approximate and true path generated by another embodiment having a linear-rotate-linear motion sequence.

FIG. 45, a section through another embodiment, analogous to FIG. 13, to achieve the path ahown in FIG. 44.

FIG. 46, an isometric schematic diagram showing the approximate and true path generated by the mechanism of FIG. 44 when the linear axis is not perpendicular to the axis of rotation.

FIG. 47, a plan view of an alternate embodiment mechanism capable of generating a rotary-linear-rotary output motion sequence.

FIG. 48, side view of the mechanism of FIG. 47.

FIG. 49, a section taken on line 49—49 of FIG. 47.

FIG. 50, an isometric schematic diagram showing the motion components which constitute the approximate path generated by the mechanism of FIGS. 47-49.

FIG. 51, an isometric schematic diagram showing the motion components which constitute the approximate path of a mechanism derived from the mechanism of FIGS. 47-49 but with the axis of rotation made parallel to the axis of linear motion.

FIG. 52, a partial plan view of a modification to the mechanism of FIG. 47 whereby the output has a linear-linear-linear motion sequence.

FIG. 53, a side view of the modification shown in FIG. 52.

FIG. 54, an isometric schematic diagram showing the motion components which constitute the approximate path generated by the modification of FIGS. 52 and 53.

FIG. 55, an isometric schematic diagram showing the motion components which constitute the approximate path generated by a modification to the mechanism of FIGS. 52 and 53 with the linear axes not perpendicular.

FIG. 56, a section through another embodiment, analogous to FIGS. 13 and 44, having a rotary-rotary-rotary motion sequence.

FIG. 57, an isometric schematic diagram showing the motion component which constitute the approximate path generated by the mechanism of FIG. 56.

FIG. 58, an isometric schematic diagram showing the motion components which constitute the approximate path of a modification to the mechanism of FIG. 56 in which the axes of rotation are not perpendicular.

INTRODUCTORY DISCLOSURE

Figure 8:
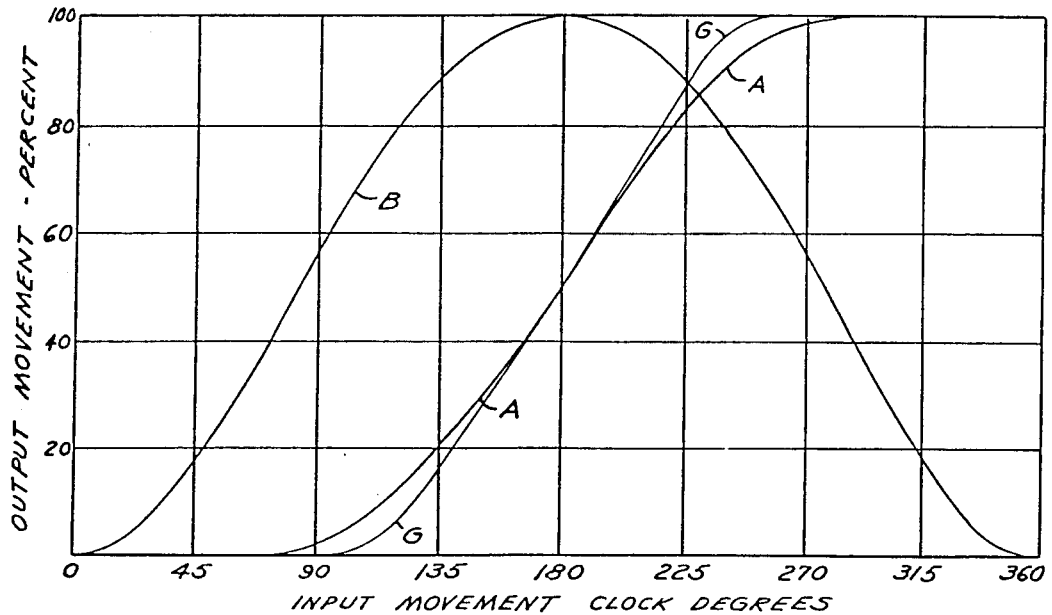
FIG. 8, a graph showing the output movement or displacement in percent for a full index cycle for the mechanism of FIGS. 1 and 2.

As will be disclosed, this invention incorporates mechanisms disclosed in my U.S. Pat. No. 4,075,911 and my copending application, Ser. No. 754,407, filed July 12, 1985, which is a continuation of application, Ser. No. 449,241, filed Dec. 13, 1982 and now abandoned. Since the dwell characteristics of one embodiment of my U.S. Pat. No. 4,075,911 are very pertinent to the characteristics of this new invention, they will be briefly reviewed.

FIGS. 1 and 2 are simplified schematic drawings of this embodiment which is proportioned to provide a 360° output for one acceleration-deceleration cycle of its output shaft. Referring to FIGS. 1 and 2, an input shaft 2 rotates on axis $A_o$ in stationary bearings in a case which is not shown. An eccentric segment 4, on the shaft 2, is concentric about an axis $A_1$ displacecd a small amount from the axis $A_o$. An input gear 6, fastened on the eccentric segment 4, is also concentric about axis $A_1$. Tangential links 8 are journalled on the eccentric segment 4. A driving gear 10 is mounted on a shaft 12 journalled in the tangential links 8 and rotates on a moving axis $A_2$; it is driven by the input gear 6 through an intermediate gear 14 also journalled in the tangential links 8. In this instance the ratio between the input gear 6 and the driving gear 10 is exactly 2:1, i.e., the input gear 6 rotates two times for every revolution of driving gear 10. Elements 2, 4 and 6 constitute a first rotating pair. Element 2 constitutes a first rotating member. Elements 4 and 6 constitute a first eccentric member.

An eccentric plate 16 is mounted on the shaft 12 and in turn supports an eccentric gear 18 concentric about a moving axis $A_3$. This eccentric gear 18 meshes with an output gear 20 mounted on an output shaft 22 rotating on a stationary axis $A_4$ in bearings mounted in the case not shown. The eccentric gear 18 and the output gear 20 are equal in size to provide the 360° output cycle. The eccentric gear 18 is held in mesh with the output gear 20 by a radial link 4 which is journalled on the output shaft 22 and on a stub shaft 26 mounted on the eccentric gear 18 concentric about axis $A_3$. Elements 10, 12, and 18 constitute a second rotating pair. Elements 10, 12 constitute a second rotating member. Element 18 constitutes a second eccentric member.

The distance from axis $A_o$ to axis $A_1$ will be defined as eccentrically $E_2$, while the eccentricity between axis $A_2$ and axis $A_3$ is defined as eccentricity $E_1$. The addition of this second eccentricity $E_2$, which rotates at an integral multiple number of times for each rotation of the eccentricity $E_1$, makes it possible to achieve a wide variety of kinematic effects on the rotation of the output shaft 22. This is disclosed in considerable mathematical detail in my existing U.S. Pat. No. 4,075,911.

The mechanism of FIGS. 1 and 3, designated mechanism 28, is configured to create a relatively long dwell in terms of input angle rotation, in which the dwell is not a true stationary condition of the output shaft, but rather, multiple small amplitude oscillation of the output shaft about the center of these oscillations, which is defined as the zero point for output angle measurement.

The qualitative behavior of the system near dwell is shown in FIG. 3. At the starting point, or center of dwell, the primary elements are shown in solid lines in FIG. 3 and are labeled without subscript. If, from this starting position, the input shaft is rotated 120° clockwise, the relative position of the elements is shown by dotted lines and the suffix label "A". Similarly, if the input shaft is rotated 120° counterclockwise, the relative position of the elements is shown by dashed lines and the suffix leter "B". Throughout this movement range of the input shaft, the movement of the output gear is too small to be shown diagrammatically. In effect, the eccentric gear 18 rolls on a nearly stationary output gear 20. A marker line, Z, has been placed on the output gear 20 to show its rotation during a given cycle. With the plus or minus 120° rotation of the input shaft 2, illustrated in FIG. 3, the resultant rotation of the output gear 20 is too small to be shown graphically through the marker line Z.

However, through a quantitative analytical process, the output movement characteristics versus input movement, in the dwell area of the mechanism, are graphically portrayed in FIG. 7. The data for this graph were obtained by the methods and formulas disclosed in my U. S. Pat. No. 4,075,911. The output movement is scaled to read in percent of total output movement per cycle which is most convenient for the applications intended, as will be shown. The input movement is scaled in "clock" degrees, which has a defined range of 360° per cycle. Since the input shaft 2 rotates through two revolutions or 720° per cycle, due to the 2:1 gear ratio between input gear 6 and drive gear 10, which corresponds to a 360° clock angle, it is clear that each degree of clock angle corresponds to 2 degrees of input shaft angle. From FIG. 7, it is clear that the output movement oscillates within a band of ±0.1% for an input movement range from −74° to +70°; this output movement is equivalent to ±0.36 degrees rotation of the output shaft 22, while the input movement is equivalent to −148° to +140° of actual rotation of the input shaft 2. Therefore, while no actual true dwell or standstill of the output shaft 2 is achieved, the extremely small oscillation of the output shaft 2 for such a wide range of input movement is very useful in the practical application to be disclosed. The input angle in FIG. 7 is also noted from 284° to 432° to indicate that the "dwell" chaacteristics are the same for each cycle of the mechanism.

The qualitative behavior of the mechanism 28 at 90° clock angle intervals is shown in FIGS. 4–6. In FIG. 4, the input shaft 2 has been rotated 180° (90° clock) clockwise from the base or starting position shown in FIGS. 1 and 2 and the solid lines position in FIG. 3. It will be noted that the eccentric gear 18 has rotated somewhat less than 90° in space, but has still rolled clockwise around the periphery of the output gear 20. The resultant movement of the output gear 20, as shown by the marker line Z, is about 3° counterclockwise.

In FIG. 5, the input shaft 2 has been rotated 360° (180° clock) from its base or starting position. The eccentric gear 18 has rotated slightly more than 180° in space, and has rolled back up the side of the output gear 20, relative to FIG. 4. The total movement of the output gear 20, relative to its starting position, as shown by the marker line Z, is slightly more than 180°, counterclockwise. Therefore, in the interval represented between FIGS. 4 and 5, most of this motion has taken place.

In FIG. 6, the input shaft 2 has been rotated 540° clockwise (270° clock) from its base or starting position. The eccentric gear 18 has rotated slightly more than 270° in space and has rolled to the other side of the output gear 20 relative to FIG. 5. The total movement of the output gear 20, as shown by the marker line Z, relative to its starting position, is almost 360° counterclockwise. In the interval represented between FIGS. 4 and 5, almost 180° of additional rotation of the output gear 20 has taken place.

After an additional rotation of 180° (90° clock) of the input shaft 2 has taken place, relative to FIG. 5, the total rotation of the input shaft 2 is 720° (360° clock) and the position reached by the mechanism is again represented by the solid lines of FIG. 3. This completes a single cycle. In this final interval, represented between FIG. 5 and the solid line representation of FIG. 3, the output gear 20 has rotated approximately 2° to create the full 360° of output rotation for the cycle.

FIGS. 3, 4, 5 and 6 were presented to provide a qualitative representation of the behavior of the mechanism 18 during a single index cycle. The input-output characteristics are quantitatively shown by curve A of FIG. 8. The data for this curve were again analytically obtained using the methods and formulas disclosed in my U. S. Pat. No. 4,075,911. The input movement is again scaled in "clock" degrees, while the output movement is again scaled in percent of movement relative to the total cycle movement. Curve A of FIG. 8 and the curve of FIG. 7 represent the same movement but over a different range of input movement and with a different total output scale range. Clearly, the small oscillations which comprise the output "dwell", as shown in FIG. 7, are imperceptible in FIG. 8.

Figure 9:
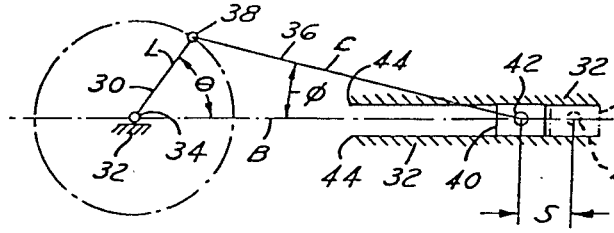
FIG. 9, a schematic drawing of a crank and slider block mechanism.

A second mechanism assembly which comprises a portion of this invention is shown in FIG. 9. This is the well-known crank and slider block mechanism which has been known to the art, and its output displacement characteracistics are briefly reviewed as a reference only.

A crank arm 30 of length L is journalled in a frame 32 through a journal 34 and is driven by a suitable source, not shown in the schematic diagram of FIG. 9. A connecting rod 36, of length C, is connected at its one end to the crank arm 30 through a crankpin 38; at its other end, the connecting rod 36 is pivotally connected to a slider block 40 through a pin 42. The slider block 40 is guided for straight line motion by guides 44 attached to the frame 32.

In this instance, the "clock" angle of the mechanism is defined as the angle $\theta$ between the crank arm 30 and the base line B, defined as the line which represents the position of the crank arm 30 when it is colinear with the connecting rod 36; this colinear position is also taken as the starting position of this "crank drive" mechanism. In the starting position of the crank drive mechanism, the slider block 40 is shown by dotted lines in FIG. 9 and designated as 40A; this is also the position of the slider block where it is most distant from the crank journal 34.

If, from this starting position, the crank arm is displaced through an angle $\theta$, (clock angle), the slider block will move through a distance, S, and the angle between the connecting rod and the base line is taken as $\phi$. From these definitions, it can be seen that:

$$L\sin\theta = C\sin\phi$$
or,

-continued $$\phi = \arcsin\left(\frac{L}{C}\sin\theta\right) \quad (1)$$

It can also be seen that:
$$S = L + C - L\cos\theta - C\cos\phi \quad (2)$$

Equations (1) and (2), with perhaps different symbols, have been long known and used. For any given values of L and C, it is possible to calculate the value of $\phi$ and S for all values of $\theta$, which is considered to be the input angle. The maximum value, $S_m$, of S is reached when $\theta = 180°$ and $S_m = 2L$, independent of the value of C. If C is arbitrarily chosen to be four times the value of L and the value of the output, S, expressed as percent of full stroke, $S_m$, then curve B of FIG. 8 is obtained. As expected, a value of 100% is reached at $\theta$ (clock angle) = 180°.

Figure 10:
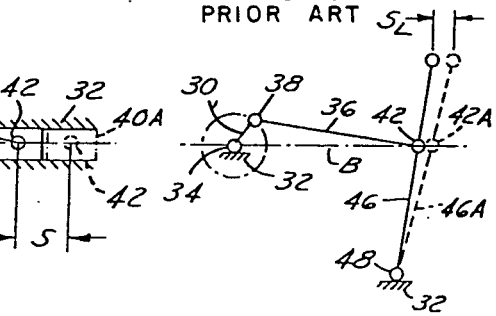
FIG. 10, a schematic drawing of a crank drive link mechanism.

FIG. 10 is a variant of the crank drive mechanism in that the slider block and its guides are replaced by a link 46 pivoted to the frame 32 through a pivot pin 48. If the angle between the base line, as previously defined, and the link 46 at mid-stroke is approximately 90°, and, if the distance between pins 48 and 42 on link 48 is large relative to the maximum stroke, the ouput, $S_L$, of this variant, again expressed as percent of full stroke, is almost identical to curve B of FIG. 8; and the greater the distance between pins 42 and 48 on link 46, the better the approximation.

The mechanism 28 of FIGS. 1 and 2 and the crank drive mechanism of FIG. 10 are combined in this invention to produce very useful combinations.

DESCRIPTION OF THE INVENTION

Referring to FIGS. 11–16, a base 50 supports a tubular column 52 reinforced with gusset plates 54. The tubular column 52 guides a ram 56 through a bushing 58 for both axial and rotary motion. A mounting block 60 is fastened to the top of the ram 56; this block 60 in turn supports two transfer arms 62 and 64 positioned at 90° to one another in this illustrative embodiment. Each transfer arm 62 and 64 in turn carries a mechanical hand 66 at its outboard end; these mechanical hands 66 are adapted to grasp or release workpieces 68. For purposes of identification, these workpieces are serially given suffix labels A, B, C, etc. A workpiece holding fixture 70 is mounted to the base 50 and acts as an idle station in the transfer system as will be disclosed. The mechanism 28 described in connection with FIGS. 1–6 is enclosed in a housing 72 attached to the base 50; its input shaft 2 is driven by a flange mount gear reducer 74 in turn driven by a motor 76. The axes labelling $A_o$ and $A_4$ noted in FIGS. 1–6 are also applicable to FIGS. 11–16.

The workpieces 68A, 68B and 68C are shown as being supported on an auxiliary conveyor 78, which is a schematic representation of a roll conveyor, belt conveyor, or pallet type workpiece transfer system such as disclosed in my U. S. Pat. No. 4,316,535. Furthermore, for the purposes of this embodiment disclosure, it will be understood that the position taken by workpiece 68E represents a delivery point in a machine load station, second transfer conveyor, or other system from which the workpiece 68E is taken away, and into which a vertical downloading of the workpiece is required.

Figure 13:
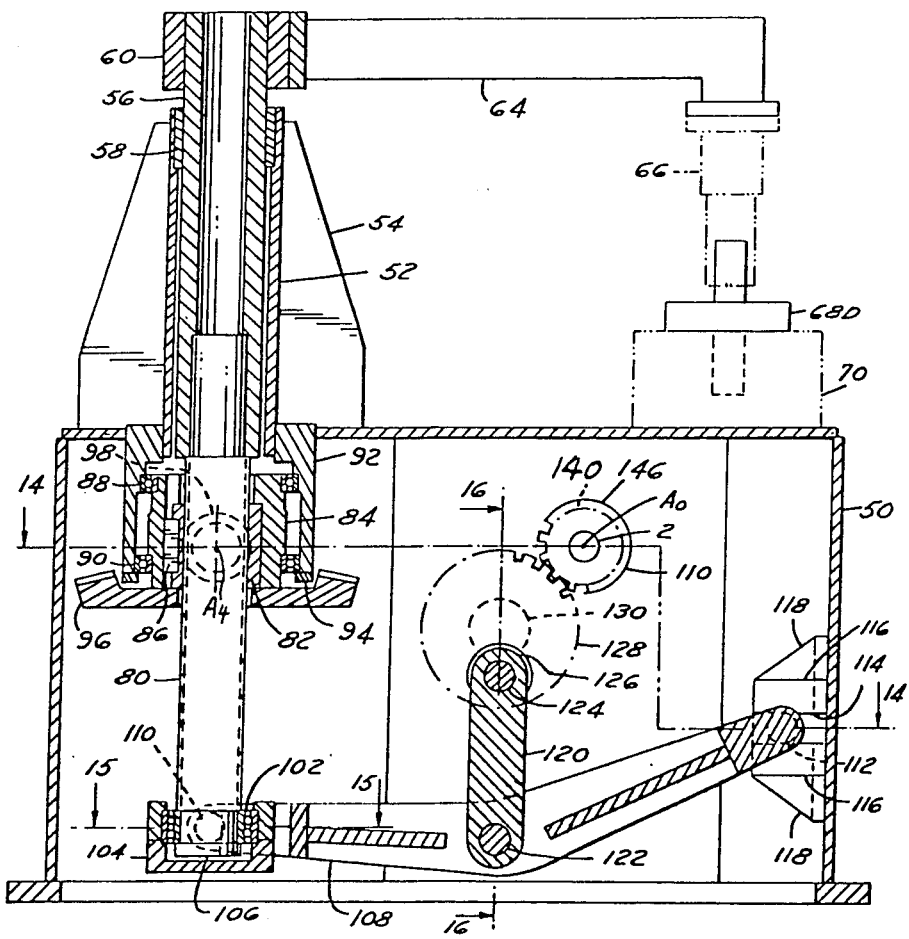
FIG. 13, a transverse section taken on line 13—13 of FIG. 11.
Figure 14:
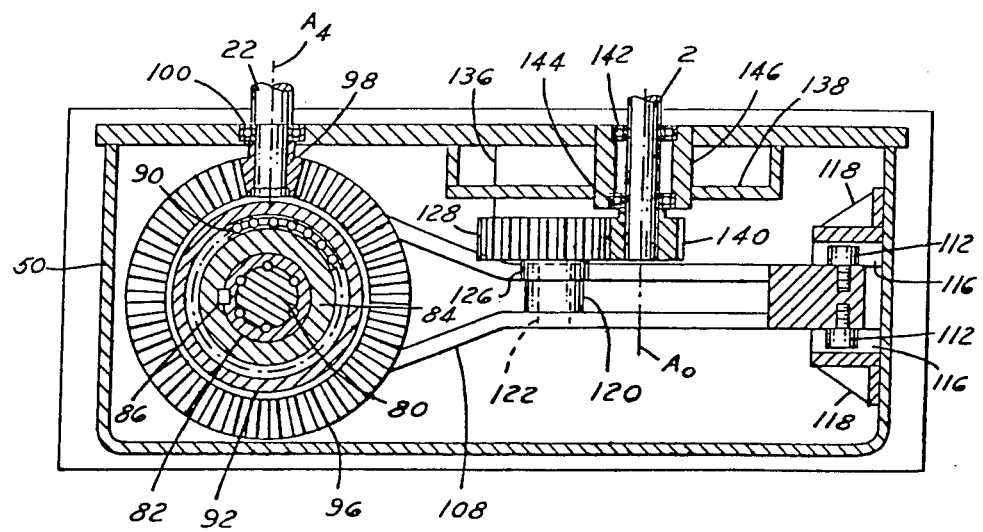
FIG. 14, a stepped section taken on line 14—14 of FIG. 13.

Referring to FIGS. 13 and 14, a ball spline shaft 80 is fastened to the bottom of the ram 56, and passes through a ball spline nut 82 through which it is driven in rotation. The ball spline nut 82 in turn is mounted into a sleeve 84 to which it is keyed through a key 86. Bearings 88 and 90, mounted in a boss 92 which is part of the base 50, and held in place by a retainer ring 94, support the sleeve 84 for rotation with respect to the base. A bevel gear 96 is mounted to the sleeve 84 for driving; this bevel gear 96 in turn is driven by a bevel gear pinion 98 (FIG. 14) mounted on and driven by the output shaft 22 of the mechanism 28 in housing 72. The ratio between the driving pinion 98 and the driven gear 96 is illustratively shown as 4:1; i.e., for one revolution of the pinion 98 the gear 96 rotates ¼ revolution or 90°. As shown, the output shaft 22 is supported by an outboard support bearing 100 in the base 50.

At its lower end, the ball spline shaft 80 is supported by a bearing 102 housed in a split lift block 104; this bearing 102 is retained on the shaft through a retainer 106. The lift block 104 is pivotally connected to a lift lever 108 through two stud type cam follower rollers 110, FIG. 15, used as pivot bearings. At its other end the lift lever 108 is connected to the base 50 through two rollers 112, which are closely fitted into slots 114 formed by guide blocks 116 mounted on brackets 118 which are attached to the base 50 (FIG. 14). It can be seen that connection of the lift lever 108 to the base 50 through rollers 112, guide blocks 116 and brackets 118, permits the right end of the lift lever (FIG. 13) to move freely in a horizontal direction, while it is still confined in a vertical direction.

Near its midpoint, the lift lever 108 is pivotally connected to one end of a connecting rod 120 through a pin 122. At its other end the connecting rod 120 is rotatably connected to a crankpin 124, which is eccentrically mounted through a flange 126 into a crank drive gear 128. The crank drive gear 128 is mounted to a flanged shaft 130 journalled through bearings 132 and 134 into a tubular housing 136 which is part of the base 50. A doubler plate 138, also part of the base 50, provides additional support for the housing 136. The crank drive gear 128 is driven by a pinion gear 140, which is splined onto the input shaft 2 of the mechanism 28. At its other end, as previously noted, this input shaft 2 is driven by the gear reducer 74; intermediately it drives the input gear 6 of the mechanism 28. Immediately inboard of the drive pinion 140, this input shaft 2 is journalled in bearings 142 and 144 mounted in a second tubular housing 146 which is also part of the base 50 and further supported by the doubler plate 138. The ratio of the pinion 140 to the crank drive gear 128 is shown as 2:1 although this ratio may be varied as will subsequently be discussed.

The starting position of the system is as shown in FIGS. 11–16, and a cycle requires two revolutions of the input shaft 2 as driven by gear reducer 74 and motor 76. These two revolutions of the input shaft 2 and the pinion 140 mounted thereon cause the crank drive gear 128 to rotate through one revolution. This in turn causes the connecting rod 120 to lift and then lower the lift lever 108 through pin 122, with rollers 112 acting as the fulcrum point of the lift lever 108. The lift lever 108, acting through the lift block 104, bearing 102, and ball spline shaft 80, lifts and lowers the ram 56 through a vertical stroke determined by the eccentricity of crankpin 124 relative to the centerline of crank drive gear 128, and the leverage ratio of lift lever 108. The transfer arms 64 and mechanical hands 66 lift and lower through this same vertical stroke, the highest point of which is shown by the dotted outline of the transfer arm 62 designated as 62A in FIG. 12. Since this lift mechanism is driven by a crank drive system, the vertical position of the transfer arms 62 and 64 and the mechanical hands 66 mounted thereon, as a function of "clock" angle, as measured by the rotation of the crank drive gear 128, is substantially represented by curve B of FIG. 8. The vertical position of the transfer arms and mechanical hands is measured from their lowermost position, and the crank drive gear angle is measured from the position shown in FIGS. 13 and 16.

As the input shaft 2 rotates through two revolutions to create the lift-lower cycle described above, it also drives the mechanism 28, causing its output shaft 22 to make one revolution, while following the displacement characteristics shown by curve A of FIG. 8. The rotation of output shaft 22 is transmitted through bevel pinion gear 98 to create a 90° rotation of the bevel gear 96. This bevel gear transmits its motion through the sleeve 84, ball spline nut 82, and ball spline shaft 80 to the ram 56 which also rotates 90°, carrying the transfer arms 62 and 64 and mechanical hands 66 with it. This rotary motion of the ram 56 occurs independently of the vertical position of the ram, due to the sliding connection of the ball spline nut and ball spline shaft. The angular position of the ram, transfer arms and mechanical hands is therefore also represented by curve A of FIG. 8 due to the linearity or proportionality of the rotary motion transfer system.

In essence then, the vertical movement of the mechanical hands as a function of the clock angle is shown by curve B of FIG. 8 and the angular movement of the mechanical hands, as measured about the centerline of the ram 56, and also as a function of the clock angle, is shown by curve A of FIG. 8.

When this vertical movement and angular movement are plotted against one another, with the clock angle as a parameter, the curve C of FIG. 17 is obtained. This is, in effect, the "developed path" of the mechanical hands generated by two revolutions of the input shaft 2. Referring again to FIGS. 11 and 12, and presuming an obvious control of the mechanical hands, the overall system will lift the workpiece 68D from its position in the idle station fixture 70; transfer arm 64 rotates 90° counterclockwise on ram 56, reaching the position 64A and then lowers to its original height bringing the workpiece to the position shown as 68E. Simultaneously, the transfer arm 62 and the mechanical hand thereon will transfer a workpiece from position 68C to 68D through the same lift, rotate, and lower sequence. In this example, it is further designated that after the system has advanced the two workpieces as described above, the mechanical hands release the workpieces, the drive motor reverses, and the empty hands return to their starting position retracing the path followed in their advancing movement while carrying the workpieces.

As noted above, the curve C of FIG. 17 represents the developed path of the mechanical hands for this embodiment. The actual path is a line on the surface of a cylinder as shown isometrically by path $P_1$ in FIG. 18.

Two other relevant points need to be made. The first is that during the "vertical" portion of the path there occurs a very slight angular oscillation of the ram 56, which creates a very slight deviation of the path (near the ends of the stroke) from a true vertical straight line; this is, of course, caused by the oscillation of the output shaft 22 during the "dwell" that is graphically portrayed by the curve of FIG. 7. Secondly, while it is convenient to describe the overall motion of the hands as being a lift, rotate, and lower motion, it is clear from the developed path of FIG. 17, and the isometric representation of FIG. 18 that the vertical motion (with the very slight aforesaid oscillation) takes place only for about 40% of the total lift stroke. Nevertheless, this general path configuration is of great practical value in loading and unloading of fixtures, pallets, or other workpiece holding devices which require that the workpiece enter or depart along a vertical or nearly vertical line.

In the embodiment of FIGS. 11-16, the angle of rotation of the ram and the transfer arms was shown as being 90°, as a result of the ratio 4:1 between pinion gear 98 and bevel gear 96. Clearly this angle of rotation of the ram can be changed by changing the aforesaid gear ratio. Similarly, the total lift stroke of the ram is determined by the eccentricity of crankpin 124 and leverage of lift lever 108 as previously noted. FIG. 19 is an isometric representation of a path $P_2$ of the mechanical hands if the lift stroke is halved and the angle of rotation increased to 120°. Nevertheless, the developed path representation of FIG. 17 still applies since the coordinates are scaled in the general terms of percentage movement.

The embodiment of FIGS. 11-16 operates with two transfer arms, 62 and 64, and two mechanical hands; for other applications, only one transfer arm may be required or for still others, a larger number of arms may be required. It is clear that the basic interrelated mechanical system will function with as many transfer arms as a practical application may require.

In the illustrative sequence described above, it was necessary for the system to reverse (with the mechanical hands open) as part of the overall application requirements. Again applications arise in which only a unidirectional operation is required. The basic path generation capabilities of the interrelated mechanical system also make this possible.

While the path representations of FIGS. 18 and 19 show the ends of the path as being vertical and the rotation component as being around a vertical axis of rotation, it is also clear that the mechanism assembly can operate in any required spatial orientation. As an illustrative example of this situation, FIG. 20 shows one of the many path configurations, $P_3$, obtainable if the mechanism is rotated in space such that the axis of the ram 56 is made horizontal.

In a broad generalization, the path generating characteristics of this total mechanism derive from the differences in the dwell and displacement characteristics of two independent but simultaneously driven mechanisms; the first is the crank drive mechanism briefly reviewed through FIGS. 9 and 10 and (as shown in FIGS. 13 to 16) comprised of the gear 128, crankpin 124, connecting rod 120, pin 122, and lift lever 108; and the second is the mechanism 28, briefly reviewed through FIGS. 1-6, and illustrative of a class of mechanisms which will be defined as "long dwell" mechanisms.

The displacement characteristics of a crank drive mechanism are generally shown by curve B of FIG. 8, while the displacement characteristics of a long dwell mechanism are generally shown by curve A of FIG. 8. Additionally, for a given cycle, comprised of 360° of clock angle, a crank drive mechanism makes a complete inherent reversing motion, returning to its starting position at the end of a cycle; while the long dwell mechanism makes a unidirectional movement during a cycle, and in which the actual movement takes place predominantly during the center two-thirds, approximately, of the cycle, and there is little or no output movement during the approximately one-sixth of the cycle at each end.

As previously noted, when these two movements occur simultaneously, with one driving a body, such as a mechanical hand, along one axis of movement while the other moves that body along another axis of movement, a composite path such as shown by curve C of FIG. 17 results.

The term "long dwell" is qualitative; for some practical applications, a dwell or near dwell at each end of a cycle which represents one-twelfth of the total input movement per cycle is adequate; other applications require a longer dwell proportion. From the parametric interrelationship between the outputs of the crank drive mechanism and the long dwell mechanism, it can be seen that the longer the dwell of the long dwell mechanism, the longer is the straight or near straight portion of the resultant path illustrated by curve C of FIG. 17.

Other "Long Dwell" Mechanisms

The long dwell mechanism 28, of FIGS. 1-6, may be replaced by other long dwell mechanisms having the same general output characteristics. All of the embodiments of my copending patent application, Ser. No. 449,241, filed Dec. 13, 1982, may be considered as long dwell mechanisms and each is especially well suited as an alternative to the mechanism 28. Because of the particular suitability of these mechanisms, they are briefly reviewed as follows.

A differential cam system usable as a long dwell mechanism, either singly or in combination with other long dwell mechanisms, is shown in FIGS. 21 to 26. Referring to these figures, an input shaft 230 is mounted in bearings 232 and 234 supported in a housing 236, and held in place by a nut 238. A crank arm 240 is made integral with the input shaft 230 or rigidly fastened thereon; at its outer end the crank arm 240 carries a crankpin 242 on an axis substantially parallel to the axis of the input shaft 230.

A cover plate 244 is bolted to the housing 236 to complete the mechanism enclosure; a cam groove 246 is cut into the plate 244 and forms a closed curve around the input shaft axis. An output shaft 248 is mounted in a bearing 250 mounted in the cover plate 244 and in a bearing 252 in the input shaft 230. The bearing 250 is retained in the cover plate 244 by a retainer ring 254 which also carries a seal 256 operating on the output shaft 248. An output arm 258 is splined to the output shaft 248 and axially positioned thereon through a spacer 260 and nut 262. The output arm 258 has formed in it a slot 264 (FIG. 23) into which is closely fitted a slider block 266 which can slide therein along a substantially radial line.

A bellcrank link 268, triangular in outline, and U-shaped in section to straddle the output arm 258 and slider block 266, is used to connect the input crank arm 240 to the output arm 258 as follows. At its apex, the bellcrank link 268 is pivoted on the crankpin 242 through a bushing 270. At the end of one leg, the bellcrank link 268 is connected to the slider block 266 through pivot pin 272 and bushing 274; and at the end of the other leg, the bellcrank link 268 carries a cam follower roller 276 and this roller operates in the cam groove 246 in the cover plate 244. The entire mechanism enclosed in the housing 236 and cover plate 244 will be referred to as the differential cam mechanism 278.

It can be seen that if it is presumed that the bellcrank link 268 is stationary with respect to the crank arm 240 that there is no relative motion between the crank arm 240 and the output arm 258, and if it is further presumed that the input shaft 230 is rotated at some given angular velocity, that the output shaft 248 will rotate in exact synchronism with the input shaft, and that under these presumptions, the path traced by the cam follower roller 276 will be a true circle concentric about the axis of the input shaft. Conversely, it can also be seen that if the cam groove 246 is a true circle about the axis of the input shaft, there is no relative motion of the bellcrank link 268 with respect to the crank arm 240, and therefore no relative motion is generated between the input and output shafts, and the output shaft rotates in exact synchronism with the input shaft. If, under these hypothetical conditions, torque and work is required by an external load on the output shaft, this torque and work must be supplied by the input shaft, but the work will be transmitted directly from the input shaft to the output shaft without passing through the cam and cam follower. This must be so since it was shown that the bellcrank link does not move relative to the input arm and hence can contribute no work.

The conditions of movement and work transfer with an illutrative contoured cam groove can be visualized through FIG. 26 which shows the essential system elements schematically at several representative angles in a one-revolution cycle. Only the centerline of the cam groove 246 is shown, together with a circular "base" circle 280 from which the actual cam follower position can be judged. The cam groove centerline 246 in FIG. 26 corresponds to the cam groove 246 illustrated in FIG. 24, and the position of the essential elements, shown in solid lines and without suffix, correspond to their positions in FIGS. 21-25; this is the arbitrary starting position of the mechanism.

The position reached by the mechanism after the input shaft and crank arm 240 have rotated approximately 12° counterclockwise from the starting position is shown by the elements in dotted schematic having the suffix letter A. The crank arm has reached the position 240A and the bellcrank link has reached the position 268A as driven by the cam follower 276A in cam groove 246. It will be noted that the output arm 258 has not moved, since the positions 258 and 258A are coincident. This situation is created by the fact that the illustrative cam groove 246 was designed to achieve exactly this result; i.e., that a portion of the movement of the crank arm 240 on either side of its starting position would result in no output movement of the output arm 258.

As the crank arm 240 rotates further counterclockwise, with the cam roller 276 confined to follow the cam groove 246, the relative rotation of the bellcrank link with respect to the crank arm slows down causing the output arm 258 to accelerate counterclockwise. At the maximum radius of the cam groove 246, this relative rotation ceases and the output arm rotates at the same angular velocity as the crnak arm, though it is still lagging in displacement.

After the crank arm has rotated approximately 80° from the starting position, a position is reached as shown by the elements having the suffix letter B. Since the cam groove 246 when engaged by the cam follower roller 276B has a greater radius than the base circle 280, the output arm 258B still lags the crank arm 240B, but, since the radius of the cam groove 246 is decreasing, the output arm 258B is now moving at a greater angular velocity than the crank arm 240B.

It should also be noted that where the cam groove 246 recrosses the base circle 280, the bellcrank link has the same relative position with respect to the crnak arm as it had at the starting position and hence the output arm has "caught up" with the crank arm.

After the crank arm has rotated approximately 280° from the starting position, a position is reached as shown by the elements having the suffix letter C. Here the cam groove 246, where engaged by the cam follower roller 276C, has a smaller radius than the base circle 280, and it can be seen that the bellcrank link has forced the output arm 258C ahead of the crank arm 240C. Futhermore, since the cam groove 246 is still becoming smaller in radius, the output arm 258C is still moving ahead of the crank arm 240C. This continues until the minimum radius of the cam groove is reached by the cam follower roller 276C at which point the output arm and the crank arm rotate at the same angular velocity.

In essence, and as more fully explained in the aforesaid copending application, the contour of the cam groove 246 can superimpose a predetermined variation on the output relative to the input. For the specific cam groove configuration shown in FIG. 24, the output will dwell for a relatively short period as shown by curve D of FIG. 27, which is analogous to curve A of FIG. 8. If the differential cam mechanism 278, shown in FIGS. 21–25 is substituted for mechanism 28 in the transfer mechanism, FIGS. 11–16, the resultant U-shaped path of the mechanical hands will have correspondingly shorter true straight portions than are shown in FIGS. 17–20.

However, by combining the differential cam mechanism 278 with other "predrive" mechanisms having an intrinsic or natural dwell once for each revolution, a significant lengthening of the dwell can be achieved. A first such predrive mechanism is shown in the simplified schematic drawings, FIGS. 28 and 29, which represent one embodiment of an approximate cycloidal motion generating mechanism 300 from my U.S. Pat. No. 3,789,676.

Referring to FIGS. 28 and 29, an input gear 302 is mounted on an input shaft 304 which is journalled in a suitable housing or frame on axis $A_1$ and driven by an appropriate external drive system. Also journalled on the input shaft 304 is a tangential link 306 which oscillates thereon as will be described. A driving gear 308 is mounted on a shaft 310 journalled in the outboard end of the link 306 on axis $A_2$, and, an intermediate gear 312, also journalled in the link 306, is formed to mesh with the input gear 302 and driving gear 308. An eccentric gear 314 is mounted on the shaft 310 with an eccentricity approximately equal to its pitch radius. This eccentric gear 314, rotating on a moving axis $A_3$, meshes with an output gear 316 mounted on a shaft 318 also journalled in the housing or frame on axis $A_4$. A radial link 320 is also journalled on the output shaft 318 at its one end; at its other end, the radial link 320 is journalled to a stub shaft 322 on axis $A_3$ mounted concentrically on the eccentric gear 314. It is the purpose of this radial link 320 to keep the eccentric gear 314 in mesh with the output gear 316 as the eccentric gear 314 moves through its rotational and translational path.

When the mechanism is in the position shown in FIG. 28, it is in a natural dwell position, i.e., a small rotation of the input gear 302 causes a corresponding rotation of the driving gear 308 and the eccentric gear 314, but this rotation of the eccentric gear 314 is accompanied by a corresponding movement of the shaft 322 about the output shaft 318, such that the gear 314 literally rolls about the output gear 316 which remains stationary or in dwell.

A qualitative schematic representation of the motion of the output gear 316 during a complete 360° rotation of the driving gear 308 and eccentric gear 314, at 90° intervals, is shown in FIGS. 30–33. An arbitrary radial marker line Z has been added to the output gear 316 to show its position change at these intervals. FIG. 30 shows the position of all gears at the center of the dwell, which is the same configuration as shown in FIG. 28. Additionally, a second position is shown in which the driving gear 308 and eccentric gear 314 have been rotated 10° counterclockwise (as driven by intermediate gear 312 and input gear 302). The rolling action of the gear 314 on the output gear 316 which remains substantially stationary during this 10° interval can therefore be visualized. In this second position, the components are redesignated by the callout siffix letter a.

As the gears 308 and 314 continue to rotate counterclockwise, the output gear 316 is accelerated and moves in the clockwise direction. After 90° of this rotation of gears 314 and 308, the position shown in FIG. 31 is reached. At this point, the acceleration of gear 316 in the clockwise direction has reached its approximate maximum, and the velocity of the gear 316 in the clockwise direction is approximately equal to its average velocity.

As the gears 308 and 314 continue their rotation counterclockwise from their position shown in FIG. 31, the output gear 316 continues to accelerate, at a decreasing rate, in the clockwise direction. After an additional 90° of rotation of gears 314 and 318, the positions shown in FIG. 32 is reached. At this point, the acceleration of the gear 316 has substantially returned to zero, and its velocity in the clockwise direction has reached an approximate maximum which is approximately double the average velocity.

As the gears 308 and 314 continue to rotate counterclockwise from the position shown in FIG. 32, the output gear 316 continues to rotate clockwise but is decelerating. After an additional 90° of rotation of gears 308 and 314, or a total of 270° from the start of the cycle, the position shown in FIG. 33 is reached. At this point, the deceleration of the output gear 316 is at or near maximum, while the velocity of the output gear 316, still in the clockwise direction, has slowed down to approximately its average velocity.

As the gears 308 and 314 continue to rotate counterclockwise from the position shown in FIG. 33, the output gear 316 continues to rotate clockwise, but is still decelerating, though now at a decreasing rate. After an additional 90° of rotation of gears 308 and 314, or a total of 360° from the start of the cycle, the position shown in FIG. 30 is again reached, with the output gear 116 having completed one revolution and is now again in dwell.

It can be seen, therefore, that as the input gear 302 is driven by some external power means at a substantially constant angular velocity, the gears 308 and 314 are driven by the intermediate gear 312. Gears 308 and 314 have an angular velocity which is determined by the superposition of the effect of the oscillation of link 306 about shaft 304 on the velocity created by the input gear 302 so gears 308 and 314 do not rotate at a constant angular velocity. And the oscillation of the gear 314 along the arcuate path controlled by radial link 320 and created by its eccentric mounting on shaft 310 creates another superposition on the velocity of the output gear 316. With the proportions shown in FIGS. 28-33, the output gear 316 will come to a complete stop or dwell once in each revolution, since the pitch diameters of gears 314 and 316 are shown as being equal.

With the mechanism shown in FIG. 28, the output motion of gear 316 has the broad characteristics of cycloidal motion, but slight distortions exist which are caused by the short length of link 306 and the arcuate rather than linear path of shaft 322. To some degree, these distortions can be compensated for by the proper choice of gear ratio between input gear 302 and driving gear 308 and the ratio of the length of link 306 to the center distance between input shaft 304 and output shaft 318.

In order to determine the exact quantitative kinematic characteristics of the mechanism shown in FIG. 28, it is necessary to use numerical methods for which a programmable calculator or computer is a great convenience, but not a necessity. Setting up classical equations of motion and then differentiating to find velocity and acceleration is excessively laborious and time consuming. But numerical calculation for the exact determination of the output shaft position for a series of discrete positions of the input shaft can be accomplished using straightforward goemetry and trigonometry. By making these calculations at sufficiently small intervals, it becomes possible, by numerical differentiation, to obtain the velocity, and then by numerically differentiating a second time, to obtain the accelerations. These calculations can be repeated as required for different values of the geometrical parameters to very closely approximate the conditions to be described below.

Pure cycloidal motion displacement in unitized coordinates and using radian angular notation is given by:

$$S = \frac{1}{2\pi}(2\pi t - \sin 2\pi t) \quad (3)$$

where t is the input variable having a range of 0 to 1 for one cycle of cycloidal motion, and S is the output displacement, also having a range of 0 to 1.

If degree notation is used and for an input angle and output angle range through one revolution of 360°, equation (3) may be rewritten:

$$\theta_o = \theta_i - \frac{360}{2\pi}\sin\theta_i \quad (4)$$

where
$\theta_o$ = output angle in degrees (shaft 318)
$\theta_i$ = input angle in degrees shaft 304/3

The relationship of equation (4) is plotted as curve E of FIG. 27; and represents the functional output of the mechanism 300 of FIGS. 28 and 29. It will be noted that there is a very slow initial rise of the output from the starting point of both input and output, which can be more easily discerned from the following table:

| Input Angle | Output Angle |
| --- | --- |
| 0° | .0 |
| 10° | .05° |
| 20° | .40° |
| 30° | 1.35° |
| 40° | 3.17° |
| 50° | 6.11° |
| 60° | 10.38° |
| 70° | 16.16° |

It can be seen from FIG. 27 that the output characteristics of the mechanism 300 of FIGS. 28 and 29, as represented by curve E, has a longer dwell than the basic differential cam mechanism 278, as represented by curve D. However, by coupling the output shaft 318 of the mechanism 300 to the input shaft 230 of the differential cam mechanism 278, the characteristics of the output shaft 248 of the differential cam mechanism 278, relative to the input shaft 304 of the mechanism 300, are shown by curve F of FIG. 27; a significant increase in dwell is achieved with this "tandem" mechanism, and curve F compares favorably with curve A of FIG. 8.

FIG. 34 is a plan view of an arrangement in which this tandem mechanism is used as the long dwell mechanism in place of the mechanism 28 in providing the drive to the gear 98 which drives the rotary motion of the transfer mechanism of FIGS. 11-16. Referring to FIG. 34, which is analogous to FIG. 11, the shaft 22 (see also FIG. 14) is directly coupled to and driven by the output shaft 248 of the differential cam mechanism 278 through a coupling 350. The input shaft 230 of the differential cam mechanism 278 in turn is coupled to and driven by the output shaft 318 of the mechanism 300 through a coupling 352. Both the differential cam mechanism 278 and the mechanism 300 are mounted on a base extension 50A. The input shaft 304 of the mechanism 300 in turn is driven by the gear reducer 74 and motor 76 as in FIG. 11. Additionally, and as shown in FIG. 34, the input shaft 304 is directly coupled to the shaft 2 (FIG. 14) through a coupling 354 which drives the lift and lower crank drive mechanism of the transfer system. However, since mechanism 300 is shown in FIGS. 28 and 29 as requiring three revolutions of its input shaft 304 for one 360° cycle of the output shaft 318, it is clear that the gear ratio between gears 140 and 128 (FIG. 14) must be changed to 3:1 from the 2:1 presently shown in FIGS. 13, 14 and 16.

Since curve F, representing the output characteristics of the tandem long dwell mechanism, comprised of the mechanism 300 driving the differential cam mechanism 278 (FIG. 34) is very similar to curve A of FIG. 8, it follows that the path followed by the mechanical hands on the transfer arms will be very similar to the paths represented by FIGS. 17-20.

It is also possible to interpose the differential cam mechanism 278, FIGS. 21-25 between the natural long dwell mechanism 28, FIGS. 1-6, and the rotate drive pinion 98, thereby further lengthening the dwell of the rotate drive system. This arrangement is shown in FIG. 35, which is again analogous to FIG. 11. The rotate drive pinion 98 is mounted on and driven by the output shaft 248 of the differential cam mechanism 278; in place of its being mounted on the output shaft 22 of the long dwell mechanism 28, as shown in FIG. 14. The input shaft 230 of the differential cam mechanism 278 in turn is directly coupled to the output shaft 22 of the long dwell mechanism 28 through a coupling 356. The input shaft 2 of the long dwell mechanism 28 is still driven by the gear reducer 74 and motor 76 as in the original embodiment, FIG. 11. Furthermore, this input shaft 2 also still drives the pinion gear 140, as before (FIG. 14) although it must be physically lengthened to accommodate the axial space required by the differential cam mechanism 278 as can be seen from FIG. 35; because of this lengthening, the input shaft is designated 2A in FIG. 35.

This interposition of the differential cam mechanism 278 between the original long dwell mechanism 28, and the rotate drive portion of the original transfer mechanism, as depicted by FIG. 35, and when properly phased such that the dwells of both mechanisms are superimposed, will increase the dwell portion of the overall output cycle. The actual performance of this tandem arrangement is shown by curve G of FIG. 8. It is clear that the increase in dwell brought about by the interposition of the differential cam mechanism is shown by the difference between curve A and curve G in FIG. 8. The overall transfer path is effected by having the vertical portions of the path curve C of FIG. 17 be proportionally longer.

Not only does the interposition of the differential cam mechanism 278 described above increase the dwell portion of the overall output cycle for the rotary drive, but the oscillations described in connection with FIG. 7 are eliminated. In reviewing the operation of the differential cam mechanism as described in connection with FIG. 26, it can be seen than any small oscillations of the crank (input) arm 240 will result in no movement of the output arm 258 for the configuration of the cam groove 246 shown.

Other mechanisms which can also be used as the predrive mechanism for the differential cam mechanism 278 to create tandem mechanisms which achieve a long dwell, and as already shown in the aforesaid copending application will be briefly reviewed.

The mechanism 400 (FIGS. 36–38) which also has a natural dwell, has been disclosed in my U. S. Pat. No. 4,018,090 and will be briefly described as follows. A case 402 supports a stationary shaft 404 on which in turn is mounted a stationary sun gear 406. A planetary carrier assembly is made up of a plate 408 and a housing 410 bolted thereto. The planetary carrier 408, 410 is mounted to the stationary shaft 404 through bearings 412 and 414 and rotates about the axis $A_o$. The periphery of the plate 408 is formed into a gear suitable for meshing with an input gear 416 mounted on a shaft 418 which rotates in bearings 420 and 422 mounted in the case 402.

A planetary gear 426 suitably formed to mesh with sun gear 406 is mounted on a planetary shaft 428 which in turn is carried in the planetary carrier 408, 410 through bearings 430 and 432. The planetary gear 426 rotates on the moving axis $A_1$ as the planetary carrier 408, 410 rotates about axis $A_o$ as driven by the input gear 416.

An eccentric support plate 434 is mounted to the planetary shaft 428 and has projecting therefrom an eccentric shaft 436 on an axis $A_2$ displaced from the axis $A_1$. A slide block 438 is rotatably mounted on the eccentric shaft 436; this slide block 438 in turn is slideably movable in a slot 440 of an output spider 442 (FIG. 38). This output spider 442 is mounted on an output shaft 444 which rotates in bearings 446 and 448 mounted in a case cover 450 fastened by bolts (not shown) to the case 402. The shaft 444 and output spider 442 rotate about an axis $A_3$ displaced from the primary axis $A_o$.

It can be seen that as the planetary carrier 408, 410 rotates about the axis $A_o$, and the planetary shaft 428 is driven about the moving axis $A_1$, the eccentric shaft 436 and its axis $A_2$ move in an epitrochoidal or epicycloidal motion, depending on the amount of displacement of the axis $A_2$ from the axis $A_1$. Provided only that the axis $A_3$ lies within the path of the axis $A_2$, the eccentric shaft 436 and the slide block 438 cause the output spider 442 and output shaft 444 to rotate about the axis $A_3$. The mathematical development of the kinematics of this system is covered in my U.S. Pat. No. 4,018,090, with specific reference to the effects created through the displacement of the axis $A_3$ from axis $A_1$.

In the specific configuration shown in FIGS. 36–38, and applicable to a combination mechanism, the pitch diameter of the planetary gear 426 is equal to the pitch diameter of the sun gear ($R=1$), and an output cycle repeats for every 360° rotation of the output shaft 444 and planetary carrier 408, 410. Further, if the eccentricity of axis $A_2$ to $A_1$ ($K$) approximates the pitch radius of the planetary gear 426 ($K=1$), the output spider 442 and output shaft 444 will come to a stop or near stop once every 360°.

The specific configuration of FIG. 36 arbitrarily shows the eccentricity of axis $A_2$ to $A_1$ equal to the pitch radius of the planetary gear 426 ($K=1$), and arbitrarily shows the eccentricity of the axis $A_3$ to axis $A_o$ to be equal to one-half of the pitch radius of the planetary gear 426, along the master center line ($E_1=0.5$, $E_2=0$). Under these conditions, the displacement characteristic of the output shaft 444 relative to the displacement of the input, planetary carrier 408, 410, are such that there exists a momentary stop or dwell of the output once for each revolution. Here again, this dwell can be significantly enhanced by combining the mechanism 400 with the differential cam mechanism 278 by directly coupling the output shaft 444 to the input shaft 230 as is illustrated through FIG. 43.

Referring to FIG. 43, the rotate drive pinion 98 is again mounted on the shaft 22, which is driven through coupling 350 from the output shaft 248 of the differential cam mechanism 278. The input shaft 230 of the differential cam mechanism 278 in turn is driven through coupling 352 by the output shaft 444 of the natural dwell mechanism 400. The input shaft 418 of the natural dwell mechanism 400 is driven through coupling 451 from the output shaft of a worm gear reducer 452; the input shaft of this reducer 452 is connected through a coupling 453 to the input shaft of a second worm gear reducer 454. The input shaft of the reducer 454 extends through the reducer and at its other end is driven through a coupling 455 by an electric motor 456. The output shaft 457 of the worm gear reducer 454 is connected through a coupling 458 to an extended shaft 2A, which drives the crank mechanism for the lifting and lowering of the transfer arms.

The differential cam mechanism 278 is phased with respect to the natural dwell mechanism 400 such that their dwells are additive as previously described, and the ratios of the gear reducers 452 and 454 are selected such that the shafts 444, 230, 248 and 22 make one revolution, from dwell to dwell, while the shafts 457 and 2A make two revolutions, with the ratio between pinion 140 and gear 128 again 2:1 as shown in FIG. 13. Stated another way, the various gear ratios are selected such that the crank drive mechanism, which operates the lift and lower portion of the transfer mechanism, completes one 360° cycle, while the rotate drive mechanism makes one revolution moving from dwell to dwell.

The dwell characteristics of the tandem mechanism comprised of predrive mechanism 400, and the differential cam mechanism 278, which together constitute a long dwell mechanism, are described more fully in the aforesaid copending patent application. They are roughly approximated by curve F, FIG. 27, while having a slightly shorter true dwell. The developed path of the transfer path, accordingly, has slightly shorter straight line vertical lift and lower sections as compared to the path shown by curve C of FIG. 17. This arrangement is still very useful for many transfer applications.

The mechanism 460 shown in FIGS. 39, 40 and 41 is one embodiment of the mechanisms disclosed in my U.S. Pat. No. 3,730,014 and may also be used to advantage as a predrive for the differential cam mechanism 278. This mechanism 460 is configured to provide a 360° output cycle as is appropriate for this combination. A case 462 supports a stationary shaft 464 on which is mounted an input assembly, comprised of gear 466 and input spider 468 journalled on the shaft 464 through bearings 470 and 472. The gear 466 is driven by an input gear 474 mounted on an input shaft 476 journalled in the case 462 through bearings 478 and 480.

The stationary sun gear 482 is directly mounted to the shaft 464 which also supports a planetary carrier assembly, made up of plates 484 and 486 connected by spacers 488, through bearings 490 and 492. The planetary carrier assembly 484-488 carries one or more planetary gears 494, each of which is mounted on a planetary shaft 496, journalled in the planetary carrier assembly 484-488 through bearings 498 and 500. Three such planetary gears are utilized although only one is shown in FIGS. 39-41 and each gear meshes with the stationary sun gear. At one end of each of the planetary shafts 496 is mounted an input eccentric 502 on an axis displaced from the axis of the associated planetary shaft. Each input eccentric 502 can rotate in a slide block 504 (FIG. 41) closely fitted in a corresponding slot 506 of the input spider 468.

At the other end of each planetary shaft 496 is mounted an eccentric support plate 508, a portion of which is formed into an output eccentric 510. A slide block 512 (FIG. 40) is rotatably mounted on each output eccentric 510 and is closely fitted into a corresponding slot 514 in an output spider 516. This output spider 516 is mounted on an output shaft 518 which rotates in bearings 520 and 522 mounted in a case cover 524 fastened by bolts (not shown) to the case 562. The output shaft 518 and output spider 516 rotate about the same axis as the axis of the sun gear 582 and on which the input spider 468 and planetary carrier assembly 484-488 also rotate, as must be when multiple plentary gears 494 are employed.

It can be seen that as the input spider 468 is driven by the gear 466 from input gear 474, the input spider drives the planetary gears 494 through the slide blocks 504 and input eccentrics 502. If it is assumed that the input spider rotates at constant angular velocity, the planets and planetary carrier assembly will rotate at a variable angular velocity due to the eccentricity of the drive point, i.e., the input eccentric. This is covered in mathematical detail in my U.S. Pat. No. 3,730,014. The planet gears 494 in turn drive the output spider through the output eccentrics 510.

In the specific configuration shown, the planet gears 494 are equal in size to the sun gear 482, and the axis of the output eccentric lies on the pitch diameter of the planet gears 494 ($R_1=1$). Therefore, the output spider and output shaft will come to a momentary stop or dwell once for each revolution of the output shaft and planetary carrier assembly. Furthermore, in the specific configuration shown, the input eccentric is on a radial line diametrically opposite from the radial line on which the output eccentric is located, and the input eccentric axis is displaced from the axis of the planetary gear a distance equal to 0.3 times the pitch radius of the planetary gear ($R_2=3$). Under these conditions, the planetary carrier assembly is rotating more slowly than the input spider, at the time in the cycle that the output eccentric axis lies on or near the pitch line of the sun gear. This has the effect of lengthening, in terms of time or input angle, the portion of the cycle that the output spider is stopped and in dwell, or on either side of this point near dwell.

The mechanism 460 may be utilized as an alternate predrive mechanism for the mechanism 400, as is also shown by FIG. 43, utilizing the alternate callout numbers 476 and 518 (in lieu of 418 and 444 respectively). In this instance, the tandem mechanism, constituting the long dwell mechanism, is comprised of mechanism 460 and the differential cam mechanism 278. The dwell characteristics of this combination are again more fully described in the aforesaid copending application, but may again be considered as being roughly comparable to curve F of FIG. 27 though having a slightly shorter true dwell, and therefore generating a developed path having shorter straight end segments as compared to curve C, FIG. 17.

If the input eccentricity of mechanism 460 is reduced to zero by moving the input eccentric 502 to the axis of the planet gear 494, there will exist no relative movement of the input spider relative to the planetary carrier assembly 484-488. In the design of this type the input spider may be eliminated and the mechanism simplified as shown in mechanism 530, FIG. 42.

Referring to FIG. 42, a case 532 supports a stationary shaft 534 on which is mounted the sun gear 482 and the planetary carrier assembly is again made up of plates 484 and 486 and spacers 488. In this case a gear 536 is directly bolted to the planetary carrier assembly for driving; the gear 536 is driven by the input gear 474 mounted on the input shaft 476 journalled in the case as before.

The remainder of mechanism 530, FIG. 42, is identical with the mechanism 460, FIG. 39, except that the input eccentric 502 is deleted on the planetary shaft 496, since the planetary carrier assembly is now driven directly by the gear 536. In the configuration shown, the planet gear is again equal in size to the sun gear, and the axis of the output eccentric lies on the pitch diameter of the sun gear. Therefore, the output spider and output shaft will come to a momentary stop or dwell once for each revolution of the output shaft and planetary carrier assembly.

Because of the deletion of the input eccentric in mechanism 530 relative to the mechanism 460, the natural dwell characteristics of mechanism 530 are. slightly shorter. It is still useful as a predrive mechanism in a tandem mechanism with the differential cam mechanism 278, as is again shown as an alternate in FIG. 43. The detailed dwell characteristics of mechanism 530 and the dwell characteristics of its tandem combination with the differential cam mechanism 278 are again shown more fully in the aforesaid copending application.

Figure 11:
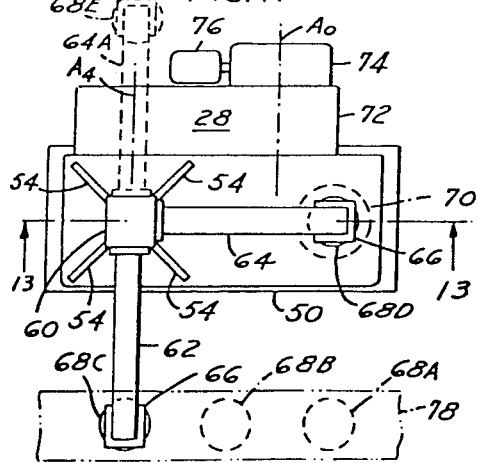
FIG. 11, a plan view of a first embodiment of this invention.
Figure 12:
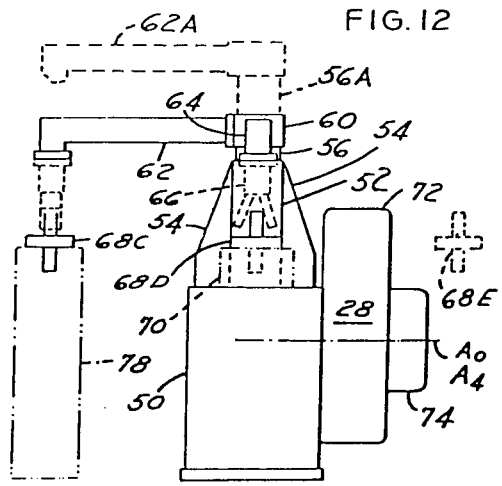
FIG. 12, a side view of the mechanism of FIG. 11.

The alternate configurations of long dwell mechanisms shown by the embodiments of FIGS. 34, 35 and 43 are presented as viable alternatives to the embodiment of FIG. 11 and any selection will be dependent on a variety of other engineering considerations.

The essence of the invention described above involves two mechanisms operating in parallel and driven simultaneously from a common source, in which one mechanism is comprised of the well-known crank and connecting rod reciprocating type mechanism, and the second consists of a mechanism, typified by having very long dwells interspaced between unidirectional index cycles. In the embodiment shown in FIGS. 11–16, the crank mechanism was suitably coupled to a lifting and lowering (linear) mechanism, while the long dwell unidirectional index mechanism was suitably coupled to a rotation mechanism, rotating on an axis parallel to the lift axis. It is equally possible to couple these two simultaneously operating mechanisms to other output movements having different movement axes or degrees of freedom. Each degree of freedom of the output will be either a rotation, or a translation, i.e., a linear motion along a predetermined axis. There are four basic categories of movement possible. These are:
1. Linear-Rotary-Linear
2. Rotary-Linear-Rotary
3. Linear-Linear-Linear
4. Rotary-Rotary-Rotary With each of these categories, there arise variations dependent on the relative orientation of their respective axes.

A first alternate application again involves a linear-rotate-linear system. Whereas in the embodiment of FIGS. 11–16 the linear and rotate axes were parallel, in this alternate, the linear movement axis and rotate movement axes are perpendicular. An isometric schematic representation of the movement axes and movement path is shown in FIG. 44. Temporarily ignoring the "rounding of the corners" typified by FIG. 17, the first portion of the movement is shown by the displacement vector $D_1$ along an axis $A_{L1}$; the second portion of the movement is shown by the displacement vector $D_2$ which is a circular arc about the axis $A_{R1}$ which is perpendicular to the axis $A_{L1}$; and the third portion of the movement is shown by the displacement vector $D_3$ along the axis $A_{L2}$ in the "opposite" direction as the vector $D_1$. The axes $A_{L2}$ is, in effect, the axis $A_{L1}$ after $A_{L1}$ has been rotated about the axis $A_{R1}$ through the angle represented by the arc of the vector $D_2$. Whereas the movement described above is represented by three discrete sequential steps, the actual movement and true path is shown by the dashed line $P_4$, which takes into account the rounding of the corners created by the movement along the vector $D_2$ beginning before the movement along vector $D_1$ has been completed. This is made clear by referring to FIG. 8 and comparing curve A with curve B, or referring to FIG. 17 which is a cross plot of curve A with curve B.

An illustrative mechanism to achieve the path shown by dashed line $P_4$ in FIG. 44 is presented in FIG. 45, which is a variation of the mechanism disclosed in FIG. 13. Referring to FIG. 44, a boss 600 is welded to the base 50 and reinforced by suitable ribs 602. A tubular shaft 604 is journalled in the boss 600 through bearings 606 and 608; at its lower end this tubular shaft supports the bevel gear 96 by which it is driven. As described in connection with FIG. 14, this bevel gear 96 is driven by a mating bevel pinion 98 mounted on the output shaft 22 of the mechanism 28, FIGS. 1 and 2 which is the unidirectional index mechanism having a very long dwell. At its upper end, the tubular shaft 604 supports a collar 610 which carries a gib slide base 612 on which is slideably mounted a gib slide 614, which can slide thereon as shown by the double arrow 616. A bracket 618 is mounted on the slide 614 and in turn carries a mechanical hand 620. The slide 614 is driven by a link 622 connected thereto by a pin 624; at its other end the link 622 is driven by a bellcrank 626 through a pin 628. A center pivot pin 630 of the bellcrank 626 is mounted in a bracket 632 on the collar 610 and slide base 612; and the other arm of the bellcrank 634 is connected through a pin 636 to an actuator rod 638 which operates inside the tubular shaft 604. At its lower end, the actuator rod is connected to the lift lever 108 through the rollers 110 and lift block 104 (FIGS. 13, 15). It will be understood that this lift block 104 is connected to the actuator rod 638 through a thrust bearing 102 in the same way that it was connected to the spline shaft 80 as shown in FIG. 13. It is possible, therefore, for the lift lever 108 to transmit an axial motion to the actuator rod 638, while that rod is rotating with respect to the lift lever. It will be further understood that the lift lever 108 is in turn driven by the crank and connecting rod assembly shown in FIGS. 13 and 14.

The sequence of motions is comparable to that described for the mechanism of FIGS. 13 and 14, except that the lift lever 108 in FIG. 45 moves the actuator rod 638 vertically instead of the ram 56 as shown in FIG. 13. A vertically upward movement of the rod 638 causes the bellcrank 626, 634 to rotate clockwise about the pin 630 and thereby moves the slide 614 to the left, pulling the mechanical hand 620 to the left or radially inward.

It can be seen, therefore, that during the initial rotation of the crankpin 124 (FIG. 14), the mechanical hand 620 is pulled radially inward, while the output shaft 22 is in substantial dwell and there is no rotation of the tubular shaft 604. Near midstroke of the crankpin 124, the output shaft 22 begins its index cycle and rotates the tubular shaft 604 through an angle determined by the ratio of pinion 98 to bevel gear 96. The path $P_4$, FIG. 44, is followed by the mechanical hand.

In the embodimnet of FIG. 45, the slide axis was shown as being perpendicular to the rotate axis. Clearly, this slide axis can be tilted up or down, or skewed so that the rotate axis and slide axis do not intersect, as applications may require. The bellcrank mechanism illustrated 626, 634 can be modified to suit the alternate axes positions. When the slide base 612, for example, is tilted 45° downward to the right, the motion path of the mechanical hand will be as shown in the isometric schematic of FIG. 46; in which the vectors $D_4$, $D_5$, and $D_6$ represent the basic motion components, and the dashed line $P_5$ represents the composite motion path.

An alternate family of motion systems is represented by the embodiment if FIGS. 47, 48 and 49. In this instance, the output motion sequence is rotate, linear, rotate. Referring to these figures, a base 650 supports a gib assembly 652 in which is slidably mounted an actuator beam 654. A gear rack 656 is mounted on the beam 654 with its axis parallel to the axis of movement of the beam in the gib assembly. A longitudinal drive pinion 658, suitably formed to mesh with the rack 656 is mounted on the output shaft 660 of a gear reducer 662, whose input shaft 664 is driven by a coupling 666 from the output shaft 22 of the mechanism 28.

The mechanism 28 is driven through its input shaft 2 by a suitable prime mover, not shown; at its other end the input shaft 2 is connected, through a coupling 668, to the input shaft 670 of a right angle gear reducer 672; the output shaft 674 of the gear reducer 672 supports and drives a crank 676 at whose outer end is mounted a crankpin 678. A connecting rod 680 is journalled at its one end to the crankpin 678, and at its other end it is journalled on a drive pin 682 (FIG. 49) mounted on the outboard end of a drive arm 684. The drive arm in turn is mounted on a rotatable housing 686 which is journalled in a bracket 668 mounted on the base 650. Within this housing is mounted a spline nut substantially similar to the mounting of the spline nut 82, FIGS. 13 and 14. A spline shaft 690 extends through this rotatable housing 686 and is angularly coupled to it through the spline nut, independent of the axial position of the spline shaft. At its outboard end, this spline shaft 690 is connected to a shaft 692 through a coupling 694. The shaft 692 is journalled in a clevis style bracket 696, and a helical gear 698 is mounted on this shaft between the two sections of the bracket 696. The gear 698 meshes with and drives a helical gear 700 which is mounted on a shaft 702 journalled in the outboard end of the beam 654, and rotates about an axis $A_{R2}$.

It will be noted that the axes of the gears 698 and 700 are non-intersecting, but at right angles in the projection of FIGS. 47, 48. At its other end the shaft 702 supports a lift arm 704, at whose outboard end is mounted a mechanical hand 706. A point 708 is defined at the end of the arm which will be utilized in the subsequent path analysis. The following properties of the mechanism are relevant:

1. The rotation of the arm 704 about the axis $A_{R2}$ is generated by the crank 676, which, it will be noted, is driven from the input shaft 2. This angular motion of the arm 704 is, therefore, analogous to the vertical motion generated by the crankpin 124 in the first embodiment, FIGS. 11–20.

2. The longitudinal straight line motion of the beam 654 is driven by the output shaft 22 of the mechanism 28, and therefore this motion of the beam is analogous to the rotary motion of the ram 56 and arms 62 and 64 in the first embodiment FIGS. 11–20

3. The ration of the gear reducer 672 is such that it rotates the crank 360° for approximately one index cycle of the output shaft 22 of the mechanism 28.

4. The angle of rotation of the lift arm 704 is dependent on the length of the crank 676, the length of the drive arm 684, and the ratio of the helical gears 698 and 700. For the subsequent sequence description, it will be assumed that the angle of rotation of the lift arm 704, for 180° rotation of the crank 676 from top dead center to bottom dead center, is 90°.

5. The longitudinal stroke of the beam 654 along its own axis is dependent on the index angle of the shaft 22, the ratio of the gear reducer 622, and the pitch diameter of the gear 658.

With these analogies in mind, it can be seen that the approximate path followed by the defined point 708, FIGS. 47, 48, will be as shown in FIG. 50, an isometric displacement diagram. In FIG. 50, the first component of movement is a rotation of the arm 704, shown by its centerline, about the centerline $A_{R2}$ from a position 704A to a position 704B; the point 708 follows the path shown by the vector $D_7$. The second component of movement is a longitudinal movement of the beam 654 as driven by the gear 658 and rack 656; this movement is to the right in FIGS. 47 and 48. Referring again to FIG. 50, this movement of the point 708 is represented by the vector $D_8$, and at the end of this second component of movement, the centerline of the lift arm 704 has reached the position 704C, and the axis of rotation $A_{R2}$ has reached the position $A_{R2}'$. The third component of motion is a reverse rotation of the lift arm 704 about the axis $A_{R2}'$ from the position 704C to 704D, and the movement of point 708 is represented by the vector $D_9$. In this description of the total movement path of the point 708, the discrete components were separetely described, which constitutes an approximation; as described in connection with the previously disclosed embodiments, it will be clear that the true path includes a rounding or blending of the "corners" created at the intersections of the component vectors, according to the quantitative path blending data as shown in FIG. 17 subject to the following obvious curve relabeling. Whereas the crank generated movement of FIG. 17 was the "vertical (linear) movement" of the first embodiment, in the embodiment of FIGS. 47, 48 and 49, this becomes the angular movement of arm 704; similarly, the "angular movement" of FIG. 17 becomes the linear movement as applied to FIGS. 47, 48 and 49.

In FIGS. 47, 48 and 49, the axis of rotation $A_{R2}$ was arbitrarily shown as being perpendicular to the axis of linear motion of the beam 654. The relationship between these two axes can be altered to suit various applications; this is accomplished mechanically by changing the angle at which the shaft 702 is journalled in the beam 654, and designing the helical gears 698 and 700 to mesh at the chosen angle.

The other extreme, relative to perpendicular, is parallel. Assuming that the axis $A_{R2}$ has been shifted until that axis becomes parallel to the linear axis of the movement of the beam 654, the approximate movement path, neglecting the corner rounding or blending, of the point 708 is as shown in the schematic drawing of FIG. 51. Another modification is also illustrated in FIG. 51; the angle of rotation of the lift arm 704, for a rotation of the crank 676 from bottom dead center to top dead center, has been reduced to 60°. With these modifications in mind, it can be seen that the three components of movement of the point 708 are shown by the vectors $D_{10}$, $D_{11}$ and $D_{12}$.

As previously noted, another category of possible movement sequence is linear-linear-linear. A mechanism to accomplish this is shown in FIGS. 52 and 53. It will be understood that this is a modification of the mechanism of FIGS. 47, 48 and 49, in which the lift arm rotate system is replaced by a gib slide arrangement; while the entire driving system mounted on base 650 remains substantially unchanged.

Referring to FIGS. 52 and 53, the actuator beam again supports the clevis bracket 696, in which is journalled the shaft 692 which is connected to the crank driven spline shaft 690 through the coupling 694. A plate 710 is mounted on the side of the beam 654; plate 710 in turn supports a gib assembly 712 in which is slidably mounted a slide plate 714 which carries a tooling beam 716, at whose lower end is mounted a mechanical hand 718. A driving rack 720 is mounted on the inner face of the slide plate 714; it is formed to mesh with a gear 722 mounted on, and driven by, a shaft 702, journalled in the beam 654, as in the previous embodiment. The shaft 702, in turn supports and is driven by the helical gear 700, which is formed to be driven by the helical gear 698 on the shaft 692, again as in the previous embodiment. The axis of movement of the slide 714 is shown in FIGS. 52 and 53 as being perpendicular to the axis of movement of the beam 654; this is arbitrary as will be subsequently discussed. The following properties of the mechanism of FIGS. 52 and 53 are again relevant:

1. The vertical motion of the beam 716 is generated by the crank 676, FIG. 47, driven by the input shaft 2, and its motion is analogous to the crank generated motions of the previously described embodiments. The vertical stroke of the beam is controlled by the various drive ratios in its drive train.

2. The longitudinal straight line motion is driven as before as described in connection with FIGS. 47, 48 and 49 and its kinematic behavior is substantially identical as described in connection therewith.

With these analogies again in mind, it is easily seen that the path of an arbitrarily chosen point 724 on the beam 716, FIG. 53 will be as shown in the schematic diagram, FIG. 54. Here again, the path is approximated by the three discrete displacement vectors $D_{13}$, $D_{14}$ and $D_{15}$; whereas the true path, reflecting the movement interrelationship behavior described in connection with FIG. 17, incorporates a rounding of the corners at the vector intersections.

Referring again to FIGS. 52 and 53, it can be seen that the axis of movement of the beam 654, which is shown as being perpendicular, can be altered to any appropriate angle, simply by rotating the plate 710, and the gib assembly 712 mounted thereon, on the side face of the beam 654 and about the axis of the shaft 702. Assuming that the plate 710 is so rotated on the beam 654 through an angle of 30° clockwise, as viewed in FIG. 53, the mechanism will generate an approximate path of the point 724 as is shown in the isometric schematic diagram of FIG. 55. In this figure, the path is again represented by three discrete displacement vectors $D_{16}$, $D_{17}$ and $D_{18}$, which again do not take into account the corner blending typified by FIG. 17.

The final category of movement sequence is rotary-rotary-rotary. An illustrative mechanism capable of producing this sequence is shown in FIG. 56. The mechanism of FIG. 56 is a modification of the system shown in FIG. 45 with only the output portion being different. Whereas collar 610, FIG. 45, had supported a slide base 612, a slightly modified collar 610A in FIG. 56 supports a clevis bracket 730, on which is pivotally mounted a lift arm 732 through a pivot pin 734. A mechanical hand 736 is mounted on the outer end of the lift arm, while the inner end of the lift arm in connected to the actuator rod 638. With the arrangement shown, and in order to lift the mechanical hand as the first step of the movement sequence, it can be seen that it is necessary that the actuator rod 638 move vertically downward during this first step. This is accomplished by arranging the crankpin 124, phasing, FIG. 13, such that it is 180° out of position at the end of the stroke, from the position shown in FIG. 13. In other words, the crankpin 124 is in its top dead center position, when the intermittent long dwell mechanism is in dwell, as at booth ends of a given cycle.

The simplified approximate movement sequence of the embodiment of FIG. 56 is shown in the isometric schematic of FIG. 57 for a reference point 738 on the mechanical hand. The first crank-generated motion causes the lift arm 732 to be rotated counterclockwise about the pin 734 and the motion of point 738 is shown by vector $D_{19}$; the second motion is a rotation of the tubular shaft about its own axis as driven by the long dwell mechanism, and is shown by vector $D_{20}$; and finally the third motion, which is a reversal of the rotation of the lift arm 732 about the pin 734, is shown by vector $D_{21}$.

In FIG. 56, the axes of the pin 734 and the tubular shaft are shown as being non-intersecting but perpendicular. It is equally possible to skew the axis of pin 734, such that the motion of the point 738 does not lie in the plane of the axis of the tubular shaft. Given that the pin 734 is so skewed for a given application, the approximate simplified pattern of sequential motion is shown by the vectors $D_{22}$, $D_{23}$ and $D_{24}$ in the isometric schematic diagram of FIG. 58.

With respect to the various embodiments shown, it can be seen that if it is desired to traverse the same path in the reverse direction with respect to the path traversed in the forward direction, it is necessary to reverse the direction of the prime mover. Furthermore, with respect to the embodiments of FIGS. 11-16, FIG. 45 and FIG. 46, in which the long dwell unidirectional index mechanism is coupled to a rotary output, it is inherently possible for a given transfer cycle to repeat in a given forward direction; in which case, the mechanical hands are driven forward along multiple sequential paths which are geometrically identical but not coincident.

On the other hand, with respect to the embodiments of FIGS. 47-49 and FIGS. 52 and 53, in which the long dwell unidirectional index mechanism is coupled to a linear output, it is practically necessary, at least with the proportions shown in these embodiments, to reverse the prime mover at the end of a given index cycle. Some few applications do arise in which several sequential forward index strokes are required; in such instances, it is clearly possible to satisfy these needs by suitably lengthening the linear movement system. For example, in the embodiment of FIGS. 47-49, this would be made possible by lengthening the beam 654, the rack 656, and the spline shaft 690 to meet such multiple forward index stroke requirements.

In the various embodiments shown, all linear movements were represented by systems using gib slides or a column and bushings. These linear movements may also be generated using straight line linkages, or approximated using four bar linkages. Similarly, all rotary movements were presented by simple pivots on the axis of rotation. When necessary, such rotary movements may also be approximated using four bar linkages of the types well known to those skilled in kinematics.

I claim:

1. In a transfer mechanism which has two degrees of freedom for movement along or about any two axes, an interrelated mechanical system to drive said transfer mechanism along a predetermined path comprising:
   (a) a frame;
   (b) transfer means mounted in said frame for movement having said two degrees of freedom,
   (c) crank drive means mounted in said frame,
   (d) first coupling means directly and uninterruptedly connecting said crank drive means and said transfer means for movement along the first of said two degrees of freedom,
   (e) second coupling means connecting said transfer means for movement along the second of said degrees of freedom with:

(f) long dwell drive means mounted in said frame,
(g) substantially constant velocity prime mover rotatable drive means rotatable in a forward direction directly and uninterruptedly driving said crank drive means and said long dwell drive means in synchronism
(h) said long dwell drive means comprising:
  (1) input means mounted for rotation in said frame,
  (2) output means mounted for rotation in said frame,
  (3) variable gear ratio means interconnecting said input means and said output means, whereby upon continuous rotation of said input means, said output means rotates in a sequence of discrete unidirectional index steps separated by dwell intervals during which said output means is substantially stationary,
  whereby when said prime mover is rotating in a forward direction, said transfer means is driven in a forward direction in a developed topologically U-shaped path comprising a first portion during which said crank drive means drives said transfer means along said first degree of freedom, and said long dwell drive means holds said transfer means substantially stationary along said second degree of freedom; a second portion during which said long dwell drive means drives said transfer means along said second degree of freedom in a forward direction while said crank drive means moves said transfer means along said first degree of freedom and then reverses this movement along said first degree of freedom; and a third portion during which said crank drive means drives said transfer means along said first degree of freedom in the opposite direction from said first portion, and said long dwell drive means holds said transfer means substantially stationary along said second degree of freedom;
  and whereby, upon directional reversal of said prime mover drive means, said transfer means is driven in a reverse direction along the same topologically U-shaped path which had been traversed by said transfer means during its movement in the forward direction;
  and alternatively whereby, upon continued rotation of said prime mover drive means in a forward direction, said transfer means is driven forward along multiple, sequential, adjacent topologiaclly U-shaped paths, which are geometrically identical but non-coincident.

2. In a transfer mechanism which has two degrees of freedom for movement along or about any two axes, an interrelated mechanical system to drive said transfer mechanism along a predetermined path comprising:
(a) a frame,
(b) transfer means mounted in said frame for movement having said two degrees of freedom,
(c) crank drive means mounted in said frame,
(d) first coupling means directly and uninterruptedly connecting said crack drive means and said transfer means for movement along the first of said two degrees of freedom,
(e) second coupling means connecting said transfer means for movement along the second of said degrees of freedom with:
(f) long dwell drive means mounted in said frame,
(g) substantially constant velocity prime mover rotatable drive means rotatable in a forward direction directly and uninterruptedly driving said crank drive means and said long dwell drive means in synchronism
(h) said long dwell drive means comprising:
  (1) an output member adapted for tangential drive and supported by said frame for rotation and connected in an operation relationship with said second coupling means,
  (2) a first rotating pair supported by said frame comprising:
    (i) a first rotating member mounted for rotation in said frame,
    (ii) a first eccentric member mounted eccentrically, in non-rotational relation to, and on said first rotating member,
  (3) a second rotating pair mounted in fixed spatial relationship with said first rotating pair comprising:
    (i) a second rotating member,
    (ii) a second eccentric member mounted eccentrically in non-rotational relation to, and on said second rotating member,
  (4) means connecting for rotation said first rotating pair and said second rotating pair for substantially an integral angular velocity ratio,
  (5) means connecting said output member and said second eccentric member in a driving relationship, and
  (6) means connecting said first rotating member and said prime mover drive means in a driving relationship,
  whereby when said prime mover is rotating in a forward direction, said transfer means is driven in a forward direction in a developed topologically U-shaped path comprising a first portion during which said crank drive means drives said transfer means along said first degree of freedom, and said long dwell drive means holds said transfer means substantially stationary along said second degree of freedom; a second portion during which said long dwell drive means drives said transfer means along said second degree of freedom in a forward direction while said crank drive means moves said transfer means along said first degree of freedom and then reverses this movement along said first degree of freedom; and a third portion during which said crank drive means drives said transfer means along said first degree of freedom in the opposite direction from said first portion, and said long dwell drive means holds said transfer means substantially stationary along said second degree of freedom;
  and whereby, upon directional reversal of said prime mover drive means, said transfer means is driven in a reverse direction along the same topologically U-shaped path which had been traversed by said transfer means during its movement in the forward direction;
  and alternatively whereby, upon continued rotation of said prime mover drive means in a forward direction, said transfer means is driven forward along multiple, sequential, adjacent topologically U-shaped paths, which are geometrically identical but non-coincident.

3. A transfer mechanism as in claim 1 in which said crank drive means comprises:

(a) an input member rotatable in said frame and driven by said primer mover drive means, (b) a crankpin member mounted on said input member and eccentric from the axis of rotation of said input member, (c) a connecting rod member rotatably connected at its one end to said crankpin member and pivotally connected at its other end to (d) lever means operating between said frame, said connecting rod and said first coupling means.

4. A transfer system as in claim 1 in which said first degree of freedom of said transfer means is linear along a first axis and said second degree of freedom of said transfer means is rotational about said first axis.

5. A transfer system as in claim 1 in which said first coupling means comprises first bearing means operating between said crank drive means and said transfer means and transmitting axial movement but not transmitting rotary relative movement.

6. A transfer system as in claim 1 in which said second coupling means comprises second bearing means operating between said long dwell drive means and said transfer means and transmitting rotary movement but not transmitting axial relative movement.

7. A transfer system as in claim 1 in which said first degree of freedom of said transfer means is linear and said second degree of freedom of said transfer means is rotational.

8. A transfer system as in claim 1 in which said first degree of freedom of said transfer means is rotational and said second degree of freedom of said transfer means is linear.

9. A transfer system as in claim 1 in which said first degree of freedom of said transfer means is linear along a first axis and said second degree of freedom of said transfer means is linear along a second axis not coincident with said first axis.

10. A transfer system as in claim 1 in which said first degree of freedom of said transfer means is rotational about a first axis and said second degree of freedom of said transfer means is rotational about a second axis not coincident with said first axis.

11. A transfer system as in claim 1 in which said first coupling means comprises first bearing means operating between said crank drive means and said transfer means and transmitting rotary movement but not transmitting axial relative movement.

12. A transfer system as in claim 1 in which said second coupling means comprises second bearing means operating between said long dwell drive means and said transfer means and transmitting axial movement but not transmitting rotary relative movement.

13. A transfer system as in claim 1 in which said long dwell drive means comprises a tandem mechanism in which a first mechanism is directly coupled to and driven by a second mechanism and said first mechanism comprises:

(a) a frame, (b) an input shaft member journalled in said frame and rotating on a first axis, (c) offset driving means mounted on said input shaft member, (d) an output shaft member journalled in said frame and rotating on a second axis substantially parallel to said first axis, (e) offset driven means mounted on said output shaft member, (f) stationary annular plate cam means mounted on said frame in a plane substantially perpendicular to said first axis and said second axis and encompassing said first axis and said second axis, and (g) cam follower means operatively associated with said plate cam means and interconnecting said offset driving means and said offset driven means, whereby a movement generated by said plate cam means in said cam follower means creates a substantially proportional movement of said driven means relative to said driving means, and said second mechanism comprises:

(h) an output member connected in an operating relationship with said input shaft member of said first mechanism, (i) a drive surface on said output member, (j) a rotary member to engage said drive surface in a tangential drive relationship, (k) means mounting said output member to guide said drive surface in a predetermined path, (l) means mounting said rotary member for rotational motion about its moving center and in driving engagement with said drive surface of said output member, (m) a rotative drive member, (n) means mounting said rotative drive member for movement in a path generally transverse of said path of said drive surface of said output member, (o) means mounting said rotary member in non-rotational relation to said drive member with the axes of said rotary member and said drive member parallel but spaced from each other wherein power rotation of said drive member causes it to rotate about the moving center of said rotary member, and (p) means to drive one of said members to impart a rotation to said rotary member while in driving relationship with said drive surface.

14. A transfer system as in claim 1 in which said long dwell drive means comprises a tandem mechanism in which a first mechanism is directly coupled to and driven by a second mechanism and said first mechanism comprises:

(a) a frame, (b) an input shaft member journalled in said frame and rotating on a first axis, (c) offset driving means mounted on said input shaft member, (d) an output shaft member journalled in said frame and rotating on a second axis substantially parallel to said first axis, (e) offset driven means mounted on said output shaft member, (f) stationary annular plate cam means mounted on said frame in a plane substantially perpendicular to said first axis and said second axis and encompassing said first axis and said second axis, and (g) cam follower means operatively associated with said plate cam means and interconnecting said offset driving means and said offset driven means, whereby a movement generated by said plate cam means in said cam follower means creates a substantially proportional movement of said driven means relative to said driving means, and said second mechanism comprises:

(h) a frame, (i) an output member adapted for tangential drive and supported by said frame for rotation, and conneted in an operating relationship with said input shaft member of said first mechanism,
(j) a first rotating pair supported by said frame comprising:
  (1) a first rotating member mounted for rotation in said frame,
  (2) a first eccentric member mounted eccentrically, in non-rotational relation to, and on said first rotating member,
(k) a second rotating pair mounted in fixed spatial relationship with said first rotating pair comprising:
  (1) a second rotating member,
  (2) a second eccentric member mounted eccentrically in non-rotational relation to, and on said second rotating member,
  (1) means connecting for rotation said first rotating pair and said second rotating pair for substantially an integral angular velocity ratio,
(m) means connecting said main output member with said first eccentric member and with said second eccentric member comprising:
  (1) a first output member in tangential driving engagement with the periphery of one of said eccentric members,
  (2) a second output member rotatably mounted to the other of said eccentric members, and
(n) power means connected to one of said rotating pairs to impart a rotary motion to that of said rotating pair.

15. A transfer system as in claim 1 in which said long dwell drive means comprises a tandem mechanism in which a first mechanism is directly coupled to and driven by a second mechanism and said first mechanism comprises:
(a) a frame,
(b) an input shaft member journalled in said frame and rotating on a first axis,
(c) offset driving means mounted on said input shaft member,
(d) an output shaft member journalled in said frame and rotating on a second axis substantially parallel to said first axis,
(e) offset driven means mounted on said output shaft member,
(f) stationary annular plate cam means mounted on said frame in a plane substantially perpendicular to said first axis and said axis second and encompassing said first axis and said second axis, and
(g) cam follower means operatively associated with said plate cam means and interconnecting said offset driving means and said offset driven means,
  whereby a movement generated by said plate cam means in said cam follower means creates a substantially proportional movement of said driven means relative to said driving means,
and said second mechanism comprises:
(h) a frame,
(i) a circular reaction member mounted in said frame and concentric about a first axis,
(j) a first rotating member mounted for rotation in said frame and rotating about said first axis,
(k) a second rotating member of the same diameter as said circular reaction member mounted for rotation on said first rotating member and rotating about a second axis displaced from said first axis and adapted for tangential driving engagement with said circular reaction member,
(l) an eccentric member mounted on said second rotating member concentric about a third axis displaced from said second axis,
(m) an output member mounted for rotation in said frame and rotating about a fourth axis displaced from said first axis and in driven engagement with said eccentric member, and connected in an operating relationship with said input shaft member of said first mechanism, and
(n) input power means driving one of said rotating members.

16. A transfer system as in claim 1 in which said long dwell drive means comprises a tandem mechanism in which a first mechanism is directly coupled to and driven by a second mechanism and said first mechanism comprises:
(a) a frame,
(b) an input shaft member journalled in said frame and rotating on a first axis,
(c) offset driving means mounted on said input shaft member,
(d) an output shaft member journalled in said frame and rotating on a second axis substantially parallel to said first axis,
(e) offset driven means mounted on said output shaft member,
(f) stationary annular plate cam means mounted on said frame in a plane substantially perpendicular to said first axis and said second axis and encompassing said first axis and said second axis, and
(g) cam follower means operatively associated with said plate cam means and interconnecting said offset driving means and said offset driven means,
  whereby a movement generated by said plate cam means in said cam follower means creates a substantially proportional movement of said driven means relative to said driving means,
and said second mechanism comprises:
(h) a first support member,
(i) an input member rotatably mounted in said support member,
(j) an output member rotatably mounted in said support member and on the same axis as said input member, and connected in an operating relationship with said input shaft member of said first mechanism, and
(k) an intermediate means connecting said input member to said output member comprising:
  (1) a stationary circular reaction member on the same axis as said input member ans said output member,
  (2) a planetary carrier frame rotatably mounted in said support member,
  (3) one or more planetary members mounted in said planetary carrier frame positioned to roll without slipping on said circular reaction member in a planetary configuration,
  (4) an input shaft extending from each said planetary members, the axis of each said shaft being parallel to, but displaced from, the axis of each said planetary member,
  (5) means connecting said input member to each said input shaft,
  (6) an output shaft extending from each said planetary member, the axis of each said output shaft being parallel to the axis of each said planetary member, and (7) means connecting said output member to said output shaft.

17. A transfer system as in claim 1 in which said long dwell drive comprises a tandem mechanism in which a first mechansim is directly coupled to and driven by a second mechanism and said first mechanism comprises:
(a) a frame,
(b) an input shaft member journalled in said frame and rotating on a first axis,
(c) offset driving means mounted on said input shaft member,
(d) an output shaft member journalled in said frame and rotating on a second axis substantially parallel to said first axis,
(e) offset driven means mounted on said output shaft member,
(f) stationary annular plate cam means mounted on said frame in a plane substantially perpendicular to said first axis and said second axis and encompassing said first axis and said second axis, and
(g) cam follower means operatively associated with said plate cam means and interconnecting said offset driving means and said offset driven means, whereby a movement generated by said plate cam means in said cam follower means creates a substantially proportional movement of said driven means relative to said driving means, and said second mechanism comprises:
(h) a first support member,
(i) an output member rotatably mounted in said support member, and connected in an operating relationship with said input shaft member of said first mechanism, and
(j) input means rotatably mounted in said support member and on the same axis as said output member comprising:
(1) a stationary circular reaction member on the same axis as said output member,
(2) a planetary carrier frame rotatably mounted in said support member,
(3) one or more planetary members mounted in said planetary carrier frame positioned to roll without slipping on said circular reaction member in a planetary configuration,
(4) an output shaft extending from each said planetary members, the axis of each said output shaft being parallel to the axis of each said planetary member, and
(5) means connecting said output member to each said output shaft.

* * * * *